United States Patent [19]

Bowdon

[11] Patent Number: 5,408,231
[45] Date of Patent: Apr. 18, 1995

[54] CONNECTION PATH SELECTION METHOD FOR CROSS-CONNECT COMMUNICATIONS NETWORKS

[75] Inventor: Edward K. Bowdon, Plano, Tex.

[73] Assignee: Alcatel Network Systems, Inc., Richardson, Tex.

[21] Appl. No.: 282,705

[22] Filed: Jul. 29, 1994

Related U.S. Application Data

[63] Continuation of Ser. No. 883,594, May 14, 1992, abandoned.

[51] Int. Cl.$^6$ .................. H04Q 11/06; H04Q 3/00; H04Q 3/495
[52] U.S. Cl. .................. 340/826; 340/827; 379/272; 379/273
[58] Field of Search .............. 340/825.01, 825.03, 340/825.79, 825.8, 826, 827; 379/248, 271, 272, 273

[56] References Cited

U.S. PATENT DOCUMENTS

| | | | |
|---|---|---|---|
| 3,129,407 | 4/1964 | Paull | 340/827 |
| 3,489,855 | 1/1970 | Wöhr et al. | 340/826 |
| 4,022,982 | 5/1977 | Hemdal | 370/54 |
| 4,038,497 | 7/1977 | Collins et al. | 370/54 |
| 4,394,541 | 7/1983 | Seiden | 340/825.79 |
| 4,991,168 | 2/1991 | Richards | 340/826 |

FOREIGN PATENT DOCUMENTS 0397370  11/1990  European Pat. Off. ..... H04Q 11/04

OTHER PUBLICATIONS

The Bell System Technical Journal, May 1962, pp. 833–856; Paull, N. C.; "Reswitching of Connection Networks".

IBM Technical Disclosure Bulletin, "Method for Specifying Partitioning in a Data Switching Unit", vol. 32, No. 4B, Sep. 1989, pp. 168–170.

K. Y. Eng, M. J. Karol, and Y. Yeh, "A Growable Packet (ATM) Switch Architecture: Design Principles and Applications", IEEE Transactions on Communications, vol. 40, No. 2, Feb. 1992, pp. 423–430.

Primary Examiner—Donald J. Yusko
Assistant Examiner—Mark H. Rinehart
Attorney, Agent, or Firm—Baker & Botts

[57] ABSTRACT

A method and system for finding a path through a communications matrix represents the assignment of a center stage switch through an input switch to input gates by an input stage array, center stage switch connections between an input stage switch and an output stage switch by a center stage array, and output stage switch connections to output gates by an output stage array, as well as representing idle input switch links to the center stage switches by an idle input array and idle output switch links from the center stage switches by an idle output array. The method and system perform a process of pumping the input stage array, output stage array and center stage array using information in the idle input link array and the idle output link array to determine an optimal center stage switch having both an idle input link between a predetermined input gate and the optimal center stage and an idle output link from the optimal center stage to a predetermined output gate as identified by the idle input link and idle output link arrays. The pumping process relies on the idle input array and idle output array for connection status data. The method and system may be used advantageously with a rearrangeable communications matrix to establish optimal connection configurations during both normal and rearrangement operations.

8 Claims, 26 Drawing Sheets

FIG. 16

SPACE_IN_MAT[IN_STAGE,IN_NUM]

|   | 1 | 2 | 3 | 4 |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | (0) |

222 — CNT_STAGE

SPACE_IN_LINK[IN_STAGE,CNT_STAGE]

|   | 1 | 2 | 3 | 4 | X |
|---|---|---|---|---|---|
| 1 | 1 | 1 | 1 | 1 | 1 |
| 2 | 1 | 1 | 1 | 1 | 1 |
| 3 | 1 | 1 | 1 | 1 | 1 |
| 4 | 1 | 1 | 1 | 1 | (1) |

238 — IDLE_STATUS

SPACE_CNT_MAT[CNT_STAGE,IN_STAGE]

|   | 1 | 2 | 3 | 4 |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| X | 0 | 0 | 0 | (0) |

234 — OUT_STAGE

SPACE_OUT_MAT[OUT_STAGE,OUT_NUM]

|   | 1 | 2 | 3 | 4 |
|---|---|---|---|---|
| 1 | 0 | 0 | 0 | 0 |
| 2 | 0 | 0 | 0 | 0 |
| 3 | 0 | 0 | 0 | 0 |
| 4 | (0) | 0 | 0 | 0 |

236 — CNT_STAGE

SPACE_OUT_LINK[OUT_STAGE,CNT_STAGE]

|   | 1 | 2 | 3 | 4 | X |
|---|---|---|---|---|---|
| 1 | 1 | 1 | 1 | 1 | 1 |
| 2 | 1 | 1 | 1 | 1 | 1 |
| 3 | 1 | 1 | 1 | 1 | 1 |
| 4 | 1 | (1) | 1 | 1 | 1 |

240 — IDLE_STATUS

*FIG. 34*

CONNECTION PATH SELECTION METHOD FOR CROSS-CONNECT COMMUNICATIONS NETWORKS

A portion of the disclosure of this patent document contains material which is subject to copyright protection. The copyright owner has no objection to the facsimile reproduction by anyone of the patent documents or the patent disclosure as it appears in the Patent and Trademark Office file of records, but otherwise reserves all copyright rights whatsoever.

CROSS REFERENCE TO RELATED APPLICATIONS

This application is a continuation of U.S. application Ser. No. 07/883,594 filed May 14, 1992, entitled "Connection Path Selection Method For Cross-Connect Communications Networks" by Edward K. Bowdon, now abandoned.

TECHNICAL FIELD OF THE INVENTION

The present invention is concerned generally with electronics and more specifically with communications systems. Even more specifically, the invention is concerned with a method and system that finds an optimal path through a communications matrix using a set of matrices or arrays that describe the status of the communication matrix and include an input stage array, a center stage array, and an output stage array, as well as arrays representing idle links from the input stage switches to the center stage switches and the idle links from the center stage switches to the output stage switches.

BACKGROUND OF THE INVENTION

Digital cross-connect communications network devices, such as the 1631 SX manufactured by Alcatel Network Systems, Inc., are designed to make connections between input gates on input switches and output gates on output switches. Known designs for such cross-connect devices make use of matrices to connect the input gates to the output gates. To limit the physical space and manufacturing costs of the matrices, designers seek to minimize the number of cross-connects in the matrix. This objective becomes more complicated as market demands for communications services increase. In particular, as network devices address larger markets, the devices must service more and more input and output signals. These factors exacerbate the space and cost limitation problems even more for communications matrix devices.

One matrix configuration that uses a minimal number of matrix cross-connects for a given number of input gates and output gates and that provides a potentially optimal solution is known as a "rearrangeable" matrix. For the rearrangeable matrix, the number of center stage switches must equal or exceed the number of input gates on each switch of the matrix. In a rearrangeable matrix, there exists a set of conditions such that, although the device does not use all input gates and all output gates, an attempt to use an idle input gate and an output gate is prohibited because existing connections block the signal flow through the matrix. This may happen, for example, if existing connections already occupy at least one link in every possible path between the input and output gates in question.

In a rearrangeable network, it is always possible to unblock a flow path from an idle input gate to an idle output gate by moving existing connections in the network. The term "rearrangeable," therefore, describes the property that for a given state of a network and any given idle pair of input and output gates, the existing connections of the matrix may be reassigned to new paths, if necessary, to connect the idle pair.

Existing methods and systems for connecting inputs to outputs in rearrangeable matrices generally use a standard rearrangement technique that determines which cross-connects of the matrix to rearrange to permit a signal to flow. N. C. Paull in "Reswitching of Connection Networks," *The Bell System Technical Journal*, May, 1962, pp. 833–856, describes this known method for unblocking a rearrangeable matrix. This method (hereinafter referred to as Paull's Method) suffers from a major limitation. Paull's Method requires breaking some of the cross-connects and making some other of the cross-connects to rearrange matrix. This procedure takes time and results in undesirable service delays or interruptions during matrix rearrangement.

It is an object of the present invention, therefore, to provide a method and system that selects an optimal connection path for a rearrangeable communications matrix that permits immediate connection of idle input gates to idle output gates. The present invention achieves this object with a minimal amount of additional circuitry and avoids the service delays and interruptions of known connection path selection methods and systems that cannot immediately select an optimal connection configuration.

It is also an object of the present invention to provide a method and system that finds an optimal connection path or configuration through a communications matrix that uses a set of five matrices, the first of which represents the assignment of input gates of input switches to center stage switches using an input array of values that associate center stage switches to the input stage switches and input gates of the input switches, the second of which represents center stage switch connections by a center stage array of values that associate center stage switches with input stage switches and output stage switches, the third of which represents output stage connections by an output stage array having values that associate output stages switches with output gates and center stage switches the fourth of which represents the idle links from the input stage switches to the center stage switches by an idle input link array having values that indicate the idle status of the links, and the last of which represents the idle links from the center stage switches to the output stage switches by an idle output link array having values that indicate the idle status of the links, and then using these five arrays the method and system perform a process called "pumping" these arrays to determine an optimal center stage switch having an idle connection between a predetermined input gate and a predetermined output gate and then sets an associated input stage array value and output stage array value to indicate the optimal center stage switch for the connection configuration.

BRIEF DESCRIPTION OF THE DRAWINGS

Other objects and advantages are apparent and best understood by reference to the following description of illustrative embodiments when read in conjunction with the accompanying drawings, wherein:

FIGS. 15 through 34 illustrate a simplified space-domain example of the preferred embodiment;

DETAILED DESCRIPTION OF THE INVENTION

Figure 1:
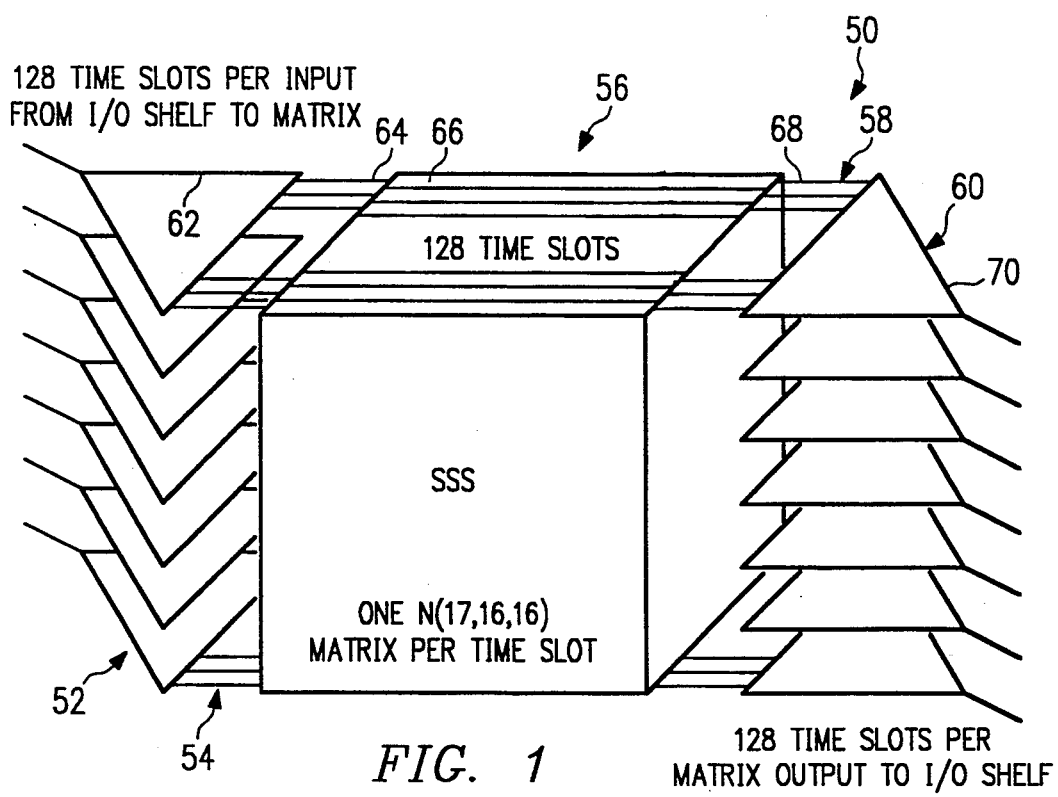
FIG. 1, shows five-stage connecting network (TSSST) with embedded three-stage space matrix (SSS)

In FIG. 1, a large matrix configuration is shown that provides for connection and test access for up to 1,024 DS3 ports (or equivalently, 32,678 DS1 ports) for the 1631 SX device. This is a five-stage, Time-Space-Space-Space-Time (TSSST)-division multiplexed connecting matrix network 50. Matrix configuration 50 includes time stage 52 that through connections 54 connects to three center space stage (SSS) designated generally by reference numeral 56. Three center space stage SSS 56 connects through output line 58 to output time stage 60. With this configuration, the network 50 includes a time-domain of time stages 52 and 60 and a space domain of three center space stage 56. FIG. 1 illustrates logically the relationship between time stages 52 and 60 and the center space stages 56. Input time stage 52 uses 128 time slots per input 62. The time slots may be represented by the connections 64 between I/O shelf inputs 62 to each time slot 66 of matrix 56. Center space stage 56 includes 128 time slots 66, each of which time slot 66 includes a N(17,16,16) matrix. The number 17 of time slot matrix 66 represents the number of center stage switches; the first number 16 represents the number of inputs to each input stage switch, and the second 16 the number of input stage switches. (By symmetry, there are 16 outputs from each output stage switch and 16 output stage switches.) Output time stage 60 uses 128 time slot connections such as connection 68 for each matrix output 70 to an I/O shelf.

Figure 2:
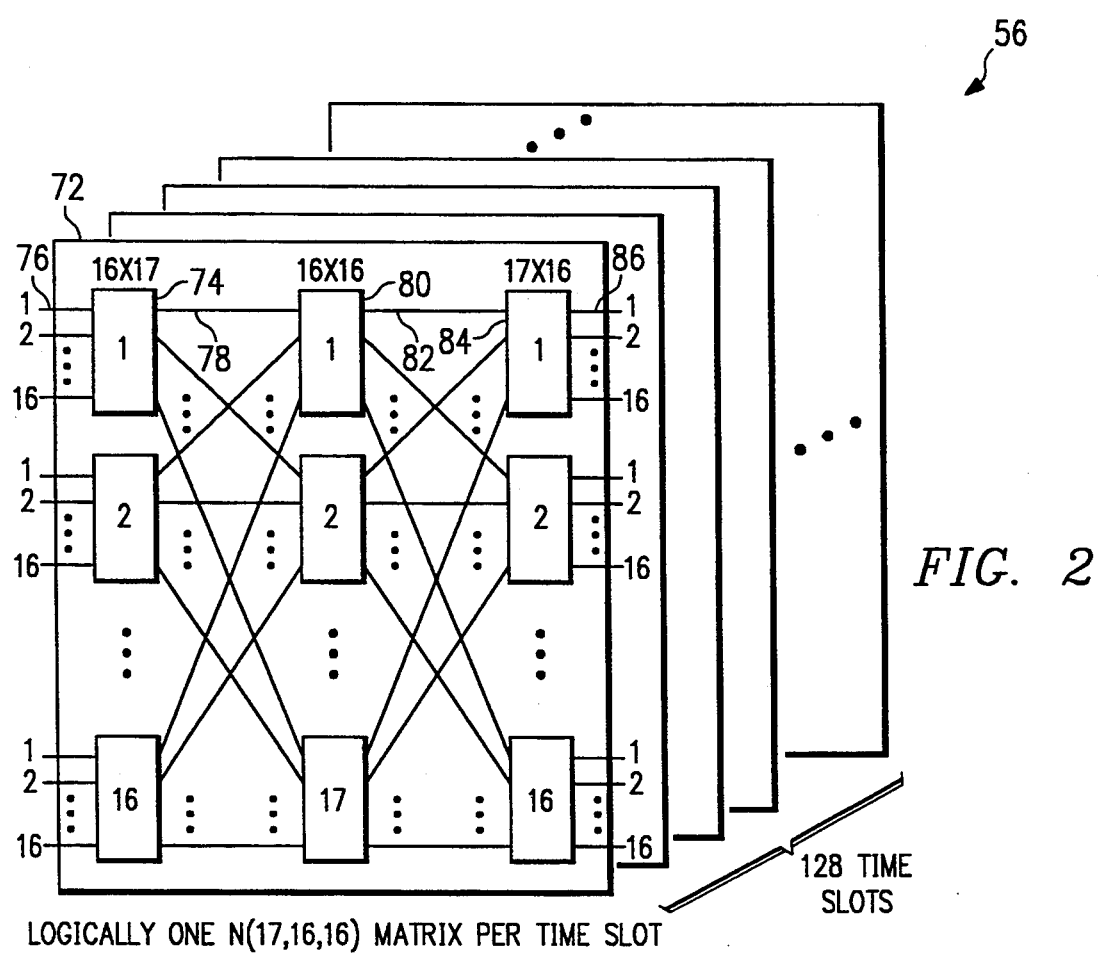
FIG. 2 shows in more detail the three-stage connecting network that may be embedded logically in the five-stage TSSST network of FIG. 1.

In FIG. 2, center space stage 56 is represented mathematically as a three-stage connecting network cube of matrices 72 for each of which the symbol N(17,16,16) fully describes each of the matrices. Thus, for each N(17,16,16) matrix 72 there are in the example of FIG. 2, 16 input switches such as input switch 74, for which each receives 16 input gates such as input gate 76. The total number of input gates 76 make up the I/O shelf-to-time slot connections 64 of FIG. 1 for each time slot. From each input switch 74 go input switch-center switch connections 78 to the center switches such as center switch 80. In the preferred embodiment, each N(17,16,16) matrix 72 includes 17 center stage switches 80. From each center stage switch 80 go 16 output switch connections 82 to output switches such as output switch 84. Each output switch 84 provides 16 output gates such as output gate 86 that connect to I/O shelves such as I/O shelf 70 of FIG. 1. The total number of output gates 86 make up the time slot-to-I/O shelf connections 68 of FIG. 1 for each time slot.

Connections are made between input gate 76 and output gate 86 immediately using the present connection technique. This technique sets up a connection by using a route through input switch 74, center switches 80 and output switches 84 that attempts to use the most used part of a matrix 72 first and the least used part of the matrix 72 last. By using the heavily-loaded part of the matrix where possible in making a given connection, when rearrangement of matrix 72 is necessary, the rearrangement process of the preferred embodiment encounters elements with the smallest number of preexisting connections. This minimizes the volume of necessary computations for matrix rearrangement.

The preferred embodiment uses a dedicated time slot when rearrangement is necessary in the time domain. For example, referring to FIG. 1, the 128th time slot may be dedicated as an extra time slot for use during matrix 50 rearrangement. Similarly, in the space domain, rearrangement uses a dedicated or extra center switch. For example, referring to FIG. 2, center switch 17 may be the dedicated or extra center switch. The present connection technique automatically uses the dedicated or extra element (either the dedicated or extra time slot in the time domain or the dedicated center stage switch in the space domain) when a rearrangeably blocked condition exists.

Figure 3:
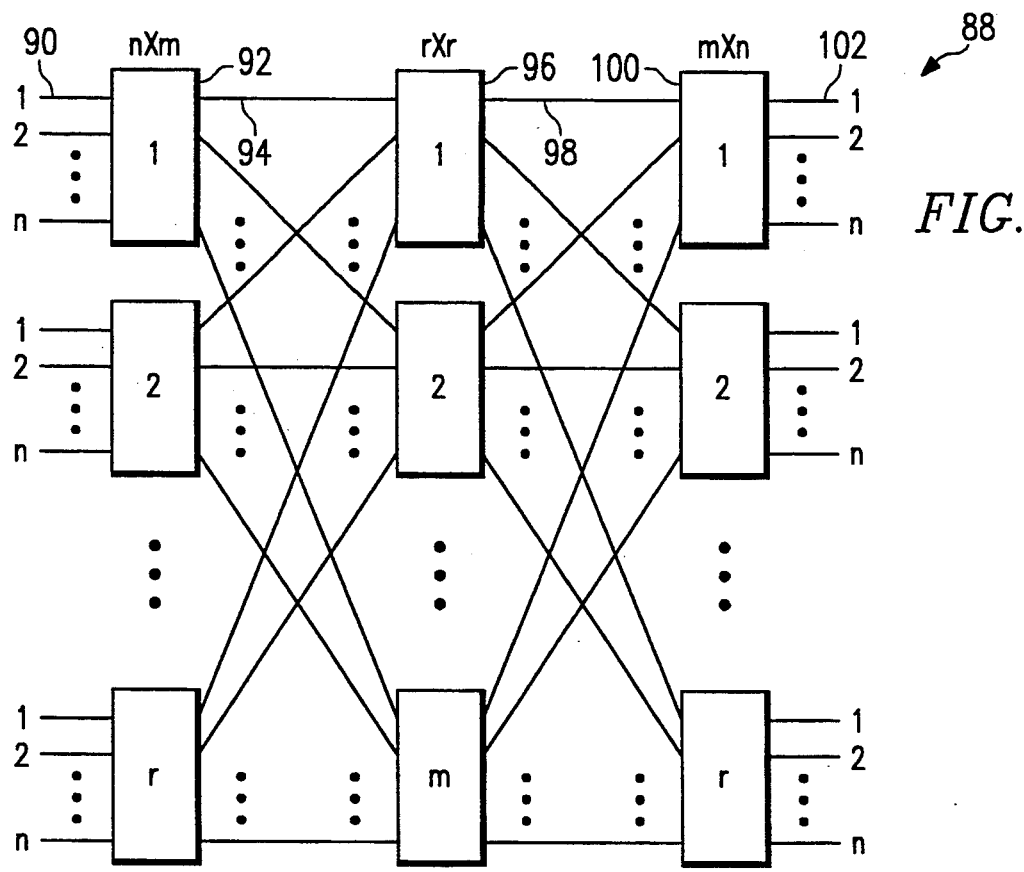
FIG. 3 is a three-stage connecting network generalized to the N(m,n,r) case.

FIG. 3 illustrates that N(17,16,16) matrix 72 of FIG. 2 may be generalized to matrix 88 for which the expression N(m,n,r) describes the configuration. Following the convention of the N(17,16,16) matrix 16, the generalized notation N(m,n,r) describes generalized matrix 88. In the N(m,n,r) notation, m equals the number of rxr center stage switches (as well as the number of outputs from each nXm input stage and the number of inputs to each mXn output stage switch); n equals the number of inputs to each nXm input stage switch (as well as the number of outputs from each mXn output stage switch); and r equals the number of nXm input stage switches (as well as the number of mXn output stage switches). Note also that, in matrix 88, m at least equals n+1. This limitation on m for a given n assures that there exists at least one extra center stage switch.

Referring more particularly to FIG. 3, generalized matrix 88 has n input gates 90 that connect to input switches, such as input switch 92, having m output connections 94. In generalized matrix 88, there may be, for example, r input switches 92. The input switch-to-center switch connections 94 connect to the rXr center switches such as center switch 96 where each center switch 96 receives r center switch connections 94 and provides r output connections 98. In the example of FIG. 3, there are m center switches 96. Each center switch-to-output switch connection 98 from center switches 96 connects to an output switch 100. Each output switch 100 receives m center switch-to-output switch connections 98 and outputs to n output gates such as output gate 102.

Both the N(17,16,16) matrix 72 of FIG. 2 and the N(m,n,r) matrix 88 of FIG. 3 are said to be rearrangeable matrices if, respectively, for a given state of the matrix and any given idle pair of input gates 76 or 90 and output gates 86 or 102, the existing connections within the matrices may be reassigned to new paths, if necessary, to allow connecting the respective idle pairs. The matrices are rearrangeable if and only if $m \geq n$. For convenience in notation, in a network described by the expression $N(m,n,r)$, the notation $\Delta(m,n,r)$ denotes the number of connections that must be rearranged in order to connect an idle pair of input and output gates. Paull's Method derives from the property that $\Delta(n,n,n) \leq n-1$. In other words, for the $N(n,n,n)$ matrix, it is necessary to move at most $n-1$ connections to connect an idle input gate to an idle output gate. A particular application of this property means, for example, that for matrix 72 of FIG. 2, rearrangement requires at most $n-1=17-1=16$ connection changes in order to connect an idle input gate to an idle output gate.

In the following discussion, FIG. 4 introduces notation to assist in understanding the preferred embodiment. FIG. 5 provides a flow chart to illustrate the basic concepts of the immediate connect method and system of the present invention. Thereafter, FIGS. 6 through 14 show an example of the operation of the method and system in the presence of a rearrangeably blocked condition of a matrix 72 of the three center stage space matrix 56. For the purpose of understanding the present invention in yet more detail, the operation of the method and system are described by way of FIGS. 15 through 34 that use a simplified $N(5,4,4)$ rearrangeable matrix having the ability to perform immediate connection in a rearrangeably blocked condition.

Figure 4:
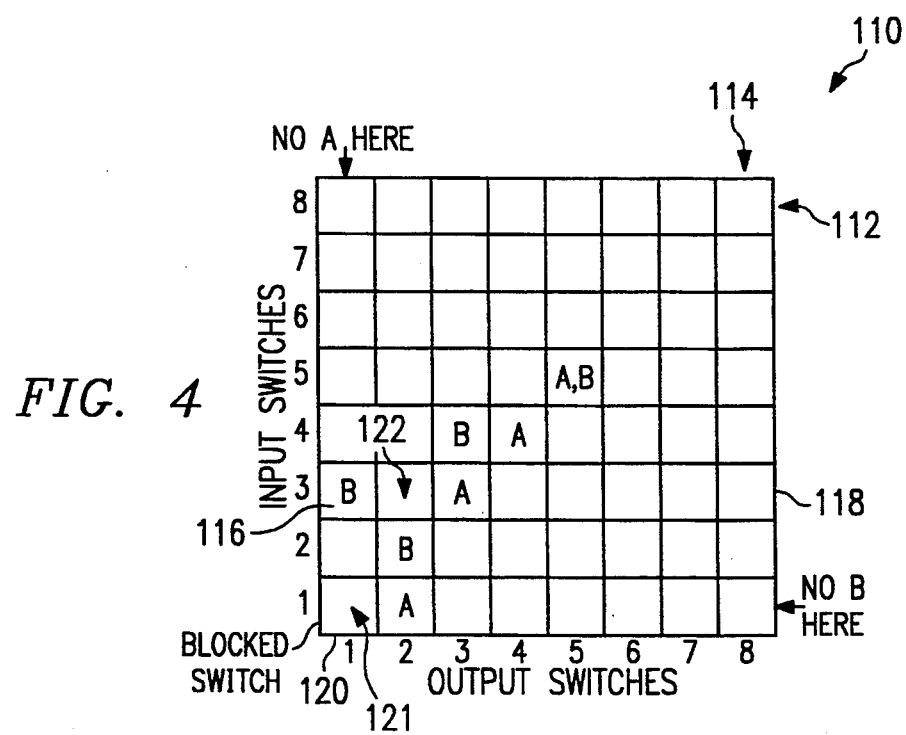
FIG. 4 introduces notation for understanding the preferred embodiment.
Figure 5:
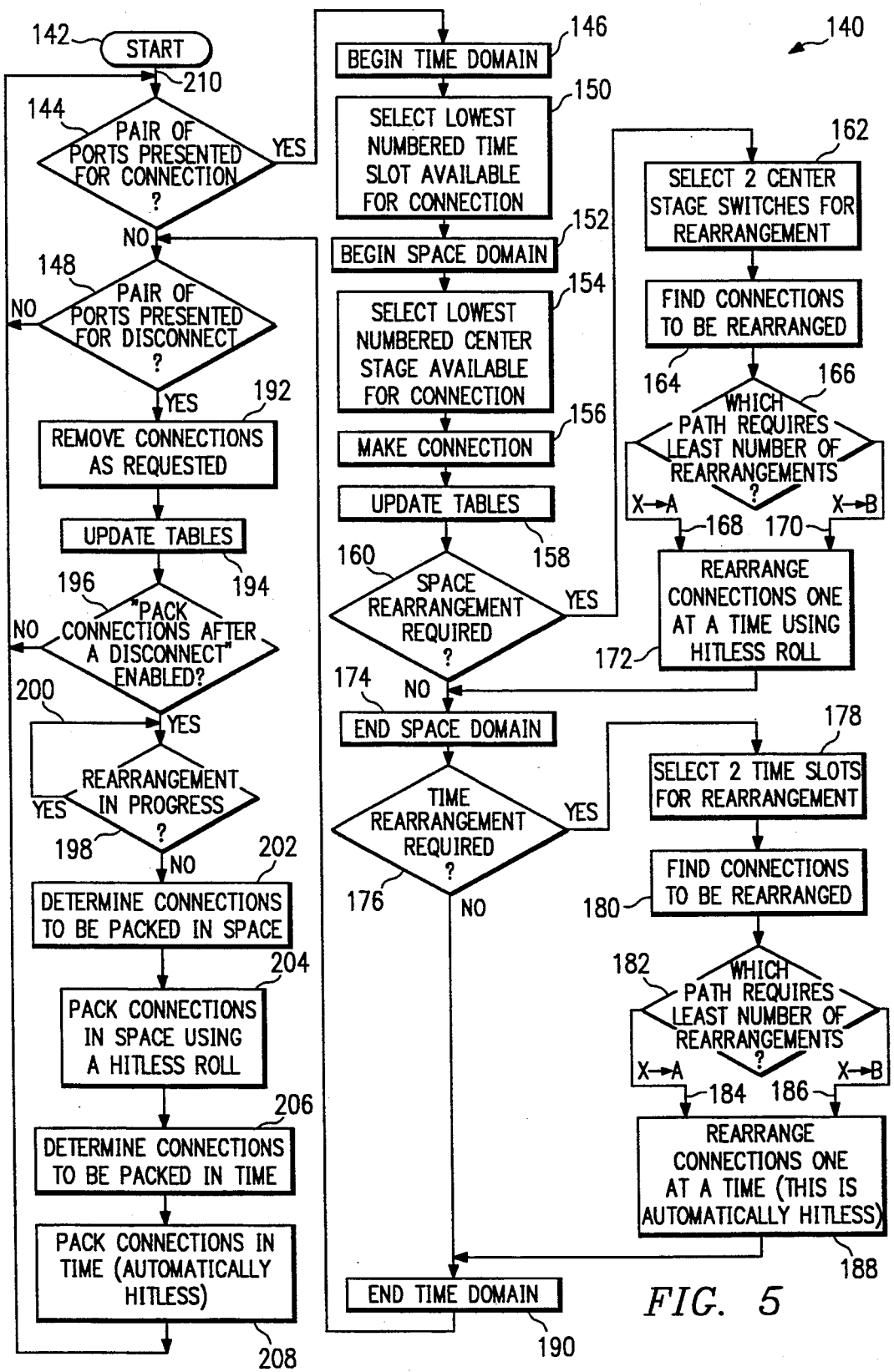
FIG. 5 provides a flow chart of the method of the preferred embodiment.

In FIG. 4, notation beneficial for understanding the present invention uses square matrix 110 to represent connections existing in a space domain matrix such as matrix 88 of FIG. 3. Square matrix 110 has rows 112 designating input switches (such as input switch 92 of FIG. 3) and columns 114 representing output switches (such as output switch 100 of FIG. 3.) The simplified example of FIG. 4 shows the number of rows 112 and columns 114 equals 8. Note that to correspond exactly to the $N(17,16,16)$ matrix of FIG. 2, FIG. 5 could show a matrix having 16 rows representing input switches 74 and 16 columns representing output switches such as output switch 84. Within each square matrix position such as matrix position 116, there are m possible symbols that may appear. These m symbols correspond to the center switches such as center stage switch 96 of FIG. 3. For example, matrix position 116 may have m possible entries, one for each of the center stage switches 96 appearing in FIG. 3.

In FIG. 4, the ordered pair (3,1) denotes matrix position 116, where 3 is the row designation, i.e., row 3 having reference numeral 118, and 1 is the column position, i.e., column 1 having the reference numeral 120. The entry B ($1 \leq B \leq m$) in matrix position (3,1) corresponds to a connection from input switch 3 through intermediate switch B to output switch 1. No entry in a matrix position such as the empty matrix position (3,2) that reference arrow 122 points to indicates the absence of any connection between input switch 3 and output switch 2.

Referring, for example, to FIG. 3, since there may be only n input gates 90 to each input switch 92 and n output gates 102 from each output switch 100, only n symbols may appear in any row 112 or column 114. Since each input switch 92 has only one connection 94 to each center switch 96, no two symbols in any row 112 may be the same. Similarly, each output switch 100 has only one connection 98 from each center switch 96. No two symbols in any column 114 may be the same.

With the notation of FIG. 4, a square matrix 110 satisfying these restrictions is said to be "legitimate" since it has only legitimate entries.

Note, that a trivial blocking case occurs if all of the input lines to an input switch such as input switch 1 designated by row 1 are already connected. This would correspond to having n symbols (e.g., 16 symbols in the case of FIG. 2) in row 1. Similarly, if all the output lines to output switch 3, for example, were already connected corresponding to n symbols in column 3 (e.g., 16 symbols for the example of FIG. 2) the network matrix 72 of FIG. 2 and 88 of FIG. 3 is trivially blocked and square matrix 110 will represent this fact.

In FIG. 5, flow chart 140 describes the steps and functions of the preferred embodiment of the present invention. Beginning at start step 142, the method is first to query, as query block 144 indicates, whether there is a pair of ports presented for connection. In the example of FIG. 3, the step is to query whether there is an idle input gate 90 to connect to an idle output gate 102. If there is such a pair, then flow goes to block 146 to begin time domain connections. If there is not a pair of ports presented for connection, then flow goes to block 148 which is described below. At begin time domain step 146, flow goes to block 150 where the method selects the lowest numbered time slot available for connection. Then, at block 152 space domain operations begin for selecting the lowest numbered center stage input switch available for connection at step 154. Having selected the lowest numbered center stage for connection, the connections are made at block 156 and square matrix 110 or a similar status table designating connections is updated at block 158.

At block 160, a query of whether space rearrangement is required takes place. If so, then flow goes to block 162 where the step is to select two center stage switches for rearrangement. Next, at block 164, the step is to find the connections to be rearranged and, from the connections, the query at block 166 is of which path requires the least number of rearrangements. If the path X→A requires the least number of rearrangements, then program flow takes path 168. If X→B requires the least number of rearrangements, then program flow takes path 170. Regardless of which path program flow takes, at step 172 connections are rearranged, one at a time, using a "hitless roll." The discussion below defines the term "hitless roll." And flow returns to step 174 to end space domain operations. Note that if no space rearrangement was necessary, then flow from query block 160 goes directly to end space domain step at block 174.

At query 176, the question is whether time rearrangement is required. If so, then flow goes to step 178 at which point the method is to select two time slots for rearrangement. Then, at block 180, the step is to find connections to be arranged. At block 182, a query occurs of which path requires the least number of rearrangements. If the X→A path requires the least number of rearrangements, flow goes along path 184. On the other hand, if the X→B path requires the least number of rearrangements, then flow follows path 186. The next step, regardless of whether program flow takes path 184 or 186, is to rearrange connections one-at-a-time, again using a hitless roll in the time domain at step 188. Program flow then goes to step 190 to end time-domain operations. Note that if query block 176 determines that no time rearrangement was required, flow proceeds directly to end time domain block 190.

From end time domain block 190, flow goes to query 148 where the method determines whether a pair of ports is presented for disconnect. If not, then flow returns to query block 144 to proceed as previously described. If a pair of ports is presented for disconnect, at this point the method is to remove connections as requested per block 192 and then update data tables reflecting the connections for the matrix at step 194.

At query 196, the method determines whether a "pack connections after a disconnect" function is enabled. If so, then flow goes to query 198 to examine whether a rearrangement is in progress. If so, then flow will loop via path 200 until rearrangement is no longer in process. Although FIG. 5 shows disconnect as occurring subsequent to completing any necessary rearrangement, the present method and system may process a disconnect request in parallel with rearrangement. Therefore, if the system of the present invention seeks to direct connections to the most used part of matrix first so as to pack calls after a disconnect, the rearrangement-in-progress query of block 198, prevents attempting to pack during rearrangement.

If a rearrangement is not in progress, from query block 198, the next step is to determine the connections to the packed in the space at step 202. The next step of flow chart 140, then, is to pack connections in the space domain using a hitless roll at block 204. And then, at block 206, the step is to determine the connections to be packed in time, after which the connections are packed at block 206 in time using an automatically hitless roll. Program flow then returns to point 210 to continue the previously described operations of flow chart 140.

The following discussion describes how steps of flow chart 140 of FIG. 5 relate to the square matrix 110 of FIG. 4. Recall that after updating square matrix 110 or similar table at step 158, the method of the preferred embodiment detects whether a rearrangeably blocked condition exists. Thus, when the dedicated element (either a time slot in the time domain or center stage switch in the space domain) in a matrix connection configuration is used to make an immediate connection between an idle input gate and an idle output gate, the existence of a rearrangeable blocking condition is automatically detected.

Steps 162 and 178 execute Paull's Method to find the path requiring the fewest rearrangements. Specifically, with the blocked cell denoted $(r_1,c_1)$ such as cell 121 of FIG. 4, the method tests to find all symbol pairs (A,B) such that if A is in row 1, but not in column 1, and B is in column 1, but not in row 1. For given pairs of symbols, say (A,B), there are two possible rearrangement sequences, one of which will be shorter. Making this determination is part of step 166 in the space domain and step 182 in the time domain.

The sequence "X→A" denotes a sequence that starts with an immediate connection through the dedicated element (e.g., center stage switch 17 of FIG. 2 for the space domain and the time slot 128 in FIG. 1 for the time domain) and ends with the blocked cell being assigned to element A. The sequence begins, for example, by starting with the blocked cell $(r_1,c_1)$ at 121 of FIG. 4). Since there is no B in row $r_1$, the search for an A in $r_1$ takes place. There must be an A in row $r_1$, otherwise the matrix is not blocked. Once the A in row $r_1$ is found, it is circled or tagged.

In general, then, suppose that the circled A is in $(r_j,c_k)$, $1 \leq j,k \leq 8$. Then, a search for a B in column $c_k$ takes place. If there is no B in column $c_k$, the sequence ends and then the next step is to find connections to be rearranged at block 164 or 180, as appropriate. If a B appears in column $c_k$, the next step is to circle the B and continue. If the circled B is in the $(r_k,c_j)$ position, then a search for an A in row $r_k$ takes place. The sequence X→A continues to alternate between circling B's in columns in A's in rows, until there exists a column with no B to circle or a row with no A to circle. Note that not all A's and all B's get circled, only those encountered in the above search.

Generating the X→B sequence occurs in similar fashion, as follows. Starting with the blocked cell $(r_1,c_1)$ 121 of FIG. 4, for example, there is no A in column 1, so the search begins for a B in column $c_1$. There must be a B in column $c_1$, otherwise the matrix would not be blocked. Then, procedure is to circle that B. Since the circled B is in position $(r_3,c_1)$, the search for an A in row $r_3$ begins. If there is no A in $r_3$, then this sequence ends and program flow continues to step 164 or 180, as appropriate for the space or time domain. Otherwise, the procedure is to circle the A and continue. In this example, the circled A is in position $(r_3,c_3)$, then the search begins for a B in column $c_3$. If there is no B in column $c_3$, then the sequence ends. Otherwise, the sequence is to circle the B and continue. This procedure continues to alternate between circling B's in columns and A's in rows until either a column with no B to circle or a row with no A to circle is found. Note, not all A's nor all B's get circled, only those encountered in the above search.

For a given pair of symbols (A,B), the next step is to choose the path generated by the sequence (either the X→A sequence or the X→B sequence) that contains the least number of circled symbols (i.e., A's or B's). For all such pairs of symbols, the step is to choose the pair (A,B) that contains the least number of circled symbols (either A's or B's). This sequence determines the minimum number of rearrangements necessary to establish a path from the input to the output of the rearrangeable matrix.

Rather than completely generating all the X→A and X→B sequences, the preferred embodiment generates the shortest sequence. This is accomplished in block 164 in the space domain and block 180 in the time domain using a technique of the preferred embodiment that shall hereinafter be called a flooding algorithm. The flooding algorithm starts by finding the first element of the X→A sequence. If the X→A sequence is not ended, the first element of the X→B sequence is found. Then, if the X→B sequence is not ended, the next element of the X→A sequence is found. This process continues until the shorter of the two sequences is generated. At the time that the shorter of the two sequences is generated, the search terminates.

The point at which flooding algorithm terminates determines the path of the minimum number of rearrangements as indicated in block 166 in the space domain and block 182 in the time domain.

In step 172 for the space domain and step 188 for the time domain, rearrangements take place using a hitless roll. The sequence of circled symbols, either A's or B's, that the above steps determined are then changed to clear the blocked cell using the appropriate X→A or X→B roll depending on which yields the minimum number of rearrangements.

The following Table 1 and accompanying text describe the steps of making the connections to yield rearrangement of the center stage switches when X→A results in the minimum number of connection rearrangements:

TABLE 1

| STEP | ACTION |
|---|---|
| 1 | X→($r_1$,$c_1$) |
| 2 | Ⓑ→Ⓑ, X |
| 3 | Ⓑ X→X |
| 4 | Ⓐ→Ⓐ, B |
| 5 | Ⓐ, B→B |
| 6 | X→X, A |
| 7 | X, A→A |

If the X→A sequence yields the minimum number of rearrangements, then, referring to square matrix 110 of FIG. 4, step 172 or 188 of FIG. 5, as appropriate, the method is to put an "X" in the ($r_1$,$c_1$) position indicating the connection was made through the extra center stage switch, (TABLE 1, Step 1 indicates this action). Then for the circled B's, the roll first adds X's (Step 2) and then removes the circled B's (Step 3). Next, for the circled A's, the roll first adds the B's (Step 4) and then removes the circled A's (Step 5). Then, for X's appearing in the matrix, A's are first added (Step 6) and then the X's are removed (Step 7).

The following Table 2 and accompanying text describe the steps of making the connection to yield rearrangement of the center stage switches when X→B results in the minimum number of connection rearrangements:

TABLE 2

| STEP | ACTION |
|---|---|
| 1 | X→($r_1$,$c_1$) |
| 2 | Ⓐ→Ⓐ, X |
| 3 | Ⓐ, X→X |
| 4 | Ⓑ→Ⓑ, A |
| 5 | Ⓑ, A→A |
| 6 | X→X, B |
| 7 | X, B→B |

The X→B roll occurs in similar fashion to that of the X→A roll. For example, the first step is to put an X in the position ($r_1$, $c_1$) indicating the connection was made through the extra center stage (TABLE 2, Step 1). For the circled A's, the roll first adds X's (Step 2) and then removes the circled A's (Step 3). Next, for the circled B's, the roll adds A's (Step 4) and then removes the circled B's (Step 5). Then, for the X's, the roll adds the B's (Step 6) and finally removes the X's (Step 7).

Rearrangement is performed as necessary using a "head-end-bridge" and a "receive-end-switch" to effect a hitless roll (including the initial connection placed in the designated or extra element) to the lower numbered elements of the matrix. The terms head-end-bridge and receive-end-switch are defined and explained illustratively in connection with the example of FIGS. 15 through 34 below. These steps leave the extra element clear and ready for the next immediate connection in a rearrangeably blocked condition.

Although it is believed that the present specification and drawings fully and accurately describe the system and provide sufficient information so that anyone skilled in the art may practice the inventive concept, "Unpublished Appendix A" is provided herewith to remain unprinted. Unpublished Appendix A includes a listing of the working source code to enable a computer to operate and perform the immediate connect method of the present method and system.

OPERATION

Having explained generally the processes of the preferred embodiment, the following illustrative example shows how the preferred embodiment provides an immediate connect in the presence of a rearrangeably blocked condition in the space domain. The time domain method becomes obvious upon understanding implementation of the space domain method.

FIGS. 6 through 14 illustrate an example of the immediate connect method of the preferred embodiment. In the square matrix 110 of FIG. 6, cell (1,1) is marked as blocked because the present connection algorithm detected that the dedicated center stage switch is the only center stage switch having both an idle link to input switch 1 and an idle link to output switch 1.

Figure 6:
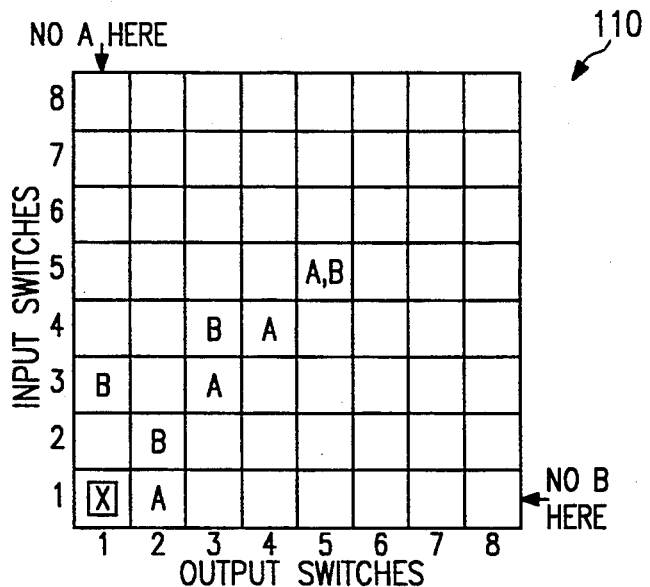
FIGS. 6 through 14 illustrate an example of the sequence generating portion of the preferred embodiments.

In response to this condition, the connection algorithm in effect puts an X at ($r_1$,$c_1$) to make the connection, as FIG. 6 shows. The use of the notation "X" herein denotes the use of the dedicated or extra center stage switch in a rearrangeably blocked condition. When the designated dedicated center stage switch of the large matrix configuration is used by the connection algorithm, a rearrangeable blocking condition is automatically detected.

Since the connection pair (1,1) is rearrangeably blocked, in order for a connection to be possible, there must exist an idle link between input switch 1 and some center stage switch, say A. Furthermore, there must exist an idle link between output switch 1 and some center stage switch, say B. The pair (A,B) is one pair of center stage switches to be considered for rearrangement. In this example, the pair (A,B) is the only pair of center stage switches that meets the above criteria. Since the pair (A,B) constitutes the entire set of pairs to be searched, (A,B) is the pair that requires the fewest rearrangements.

Figure 7:
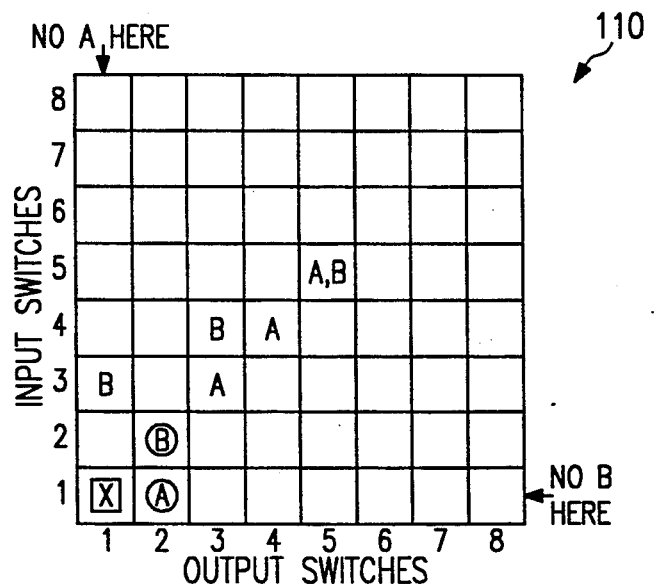
Figure 8:
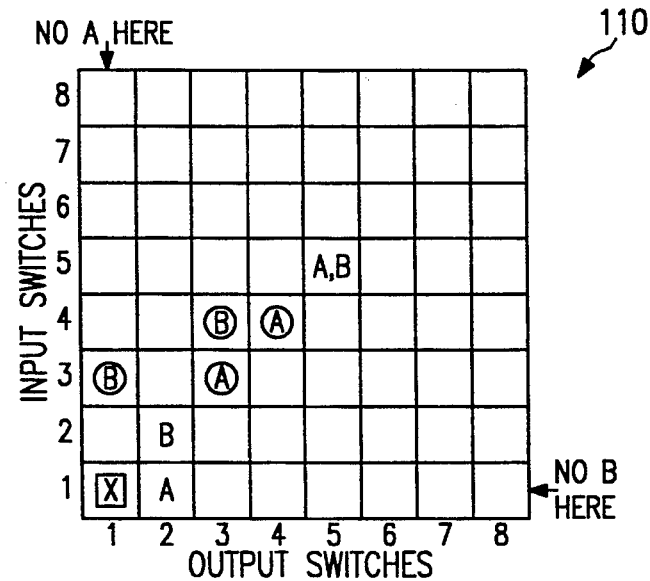

FIG. 7, shows the X→A sequence and FIG. 8 shows the X→B sequence of the immediate connect algorithm of the preferred embodiment. Together, FIGS. 7 and 8 show the operation of the flooding algorithm of the preferred embodiment. For example, the first step starts off in FIG. 7 at row $r_1$ and finds an A in ($r_1$,$c_2$) which is circled. FIG. 8 shows the second step of the flooding algorithm which uses the X→B sequence and starts off in column $c_1$ to find a circled B in ($r_3$,$c_1$). Then, the third step takes place back in FIG. 7 wherein column $c_2$ is examined for a B. This is found at position ($r_2$,$c_2$) and circled. Since there are no A's row $r_2$, this X→A sequence is complete. The two circle symbols in FIG. 7 indicate two rearrangements are required.

Although the flooding algorithm of the present method ends at the third step, if it were to continue, in FIG. 8 row $r_3$ would be examined for an A, which would be found in position ($r_3$,$c_3$). This procedure would continue to alternate between circling B's in columns and A's in rows until either a column with no B to circle or a row with no A to circle. The four circled symbols in FIG. 8, therefore, indicate four rearrangements are necessary in the example.

Since the X→A sequence requires only two rearrangements, and the X→B requires four rearrangements, the preferred embodiment chooses the X→A sequence for the pair (A,B). Since the pair (A,B) is the only pair of center stage switches being considered, the X→A sequence yields the minimum number of rearrangements.

The next step is to execute the rearrangements using the previously mentioned "hitless roll." Since the X→A sequence yields the minimum number of rearrangements, the preferred embodiment uses the X→A roll in this example. The hitless roll includes the initial connection placed in the dedicated center stage switch. This roll takes place by first performing the necessary rearrangement using a head-end-bridge and receive-end-switch.

Figure 9:
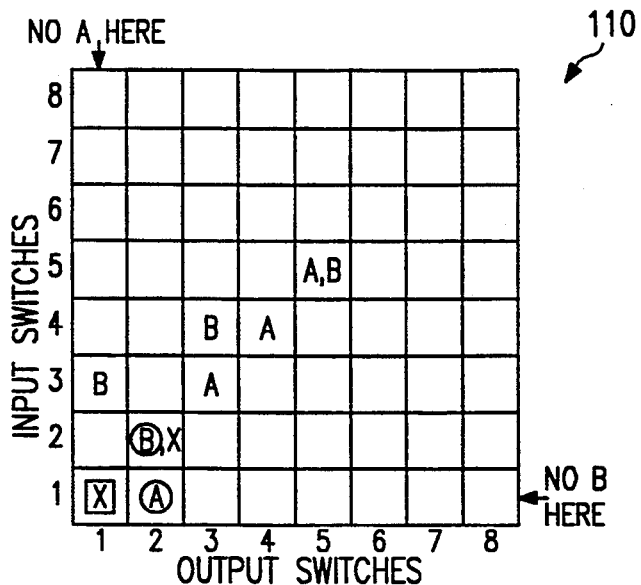

FIGS. 9 through 14 illustrate executing the X→A hitless roll. The method changes the sequence of previously circled symbols A and B to clear the blocked cell as follows:

For the circled B's add X's as FIG. 9 shows. In this example, this step corresponds to setting up a head-end-bridge through the center stage switch at the extra switch X for the existing connection from input switch 2 through center stage switch B and a receive-end-switch through center switch X for the existing connection and from center stage B to output stage 2.

Figure 10:
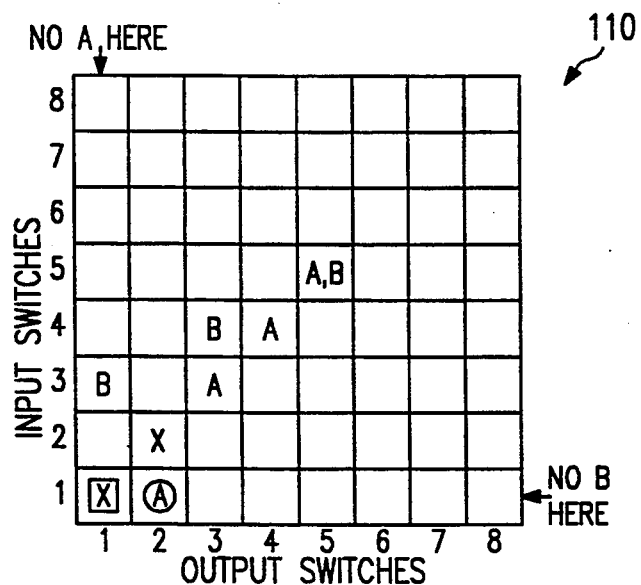

The next step is to remove the circled B's as FIG. 10 shows. In this example, when a connection exists through center stage switch X, and output switch 2 receives a good signal, the next step is to take down the connection from input switch 2 through center stage switch B to output switch 2.

Figure 11:
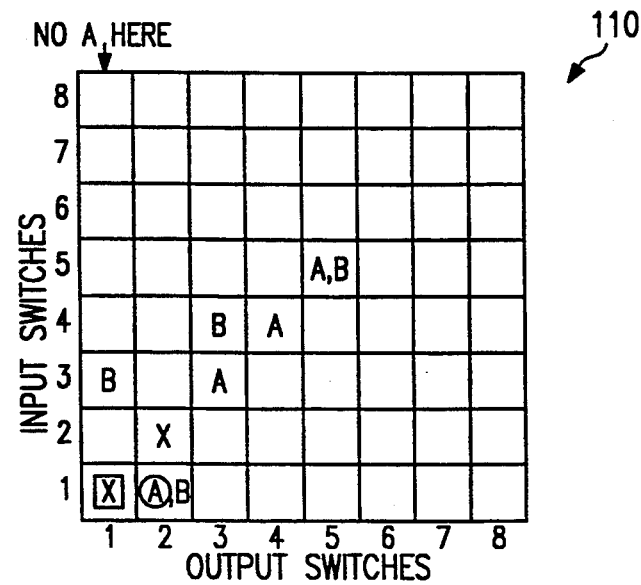
Figure 12:
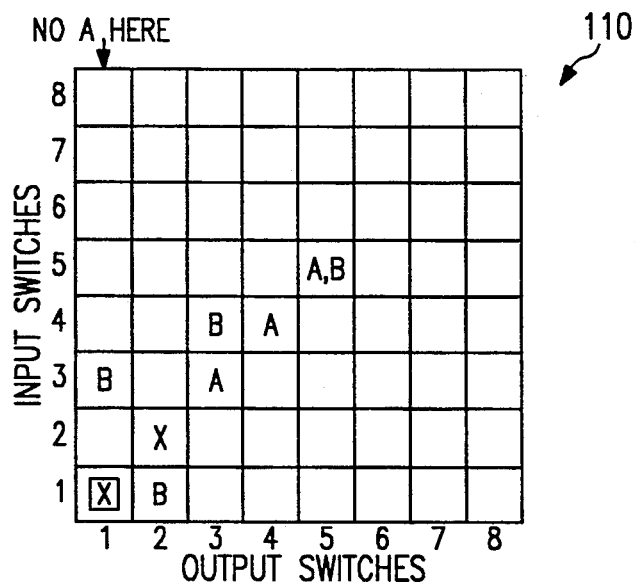

Then, as FIG. 11 shows for the circled A's add B's. In this example, this step corresponds to setting up a head-end-bridge through the center stage switch B for the existing connection from input switch 1 through center stage switch A and a receive-end-switch through center stage switch B for the existing connection from center stage switch A to output switch 2. Then, as FIG. 12 shows, the circled A's are removed. In this example, when a connection exists through center stage switch B and output switch 2 receives a good signal, the next step is to take down the connection from input switch 2 through center stage switch A to output switch 2.

Figure 13:
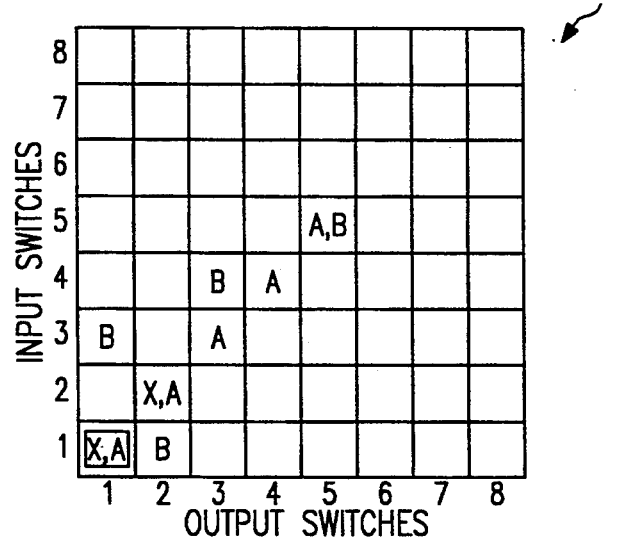

Then, the next step is to add A's to the positions containing the X's, as FIG. 13 shows. In this example, this corresponds to setting up a head-end-bridge through center stage switch A for both the connection from input switch 2 through center switch X to output switch 2 and the immediate connection from input switch 1 through center switch X to output switch 1.

Figure 14:
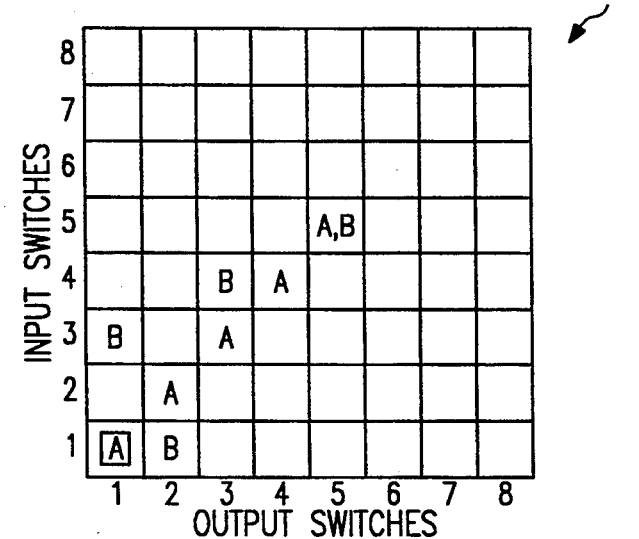

The final step is to remove the X's as FIG. 14 illustrates. In this example, when each connection through center stage switch A exists and the corresponding output switch receives a good signal, the corresponding connection from the input switch through center switch X to the corresponding output switch may be taken down. Note that the extra center stage switch X is left idle, since all connections are rolled off the extra enter stage switch X to the appropriate center stage switch.

Having described in detail the operation of the preferred method and system, the following discussion illustrates the connection path selection method and system of the preferred embodiment. For simplicity in describing this aspect of the present invention, the example considers connections in a further reduced N(5,4,4) space matrix 220 of FIG. 15.

Figure 15:
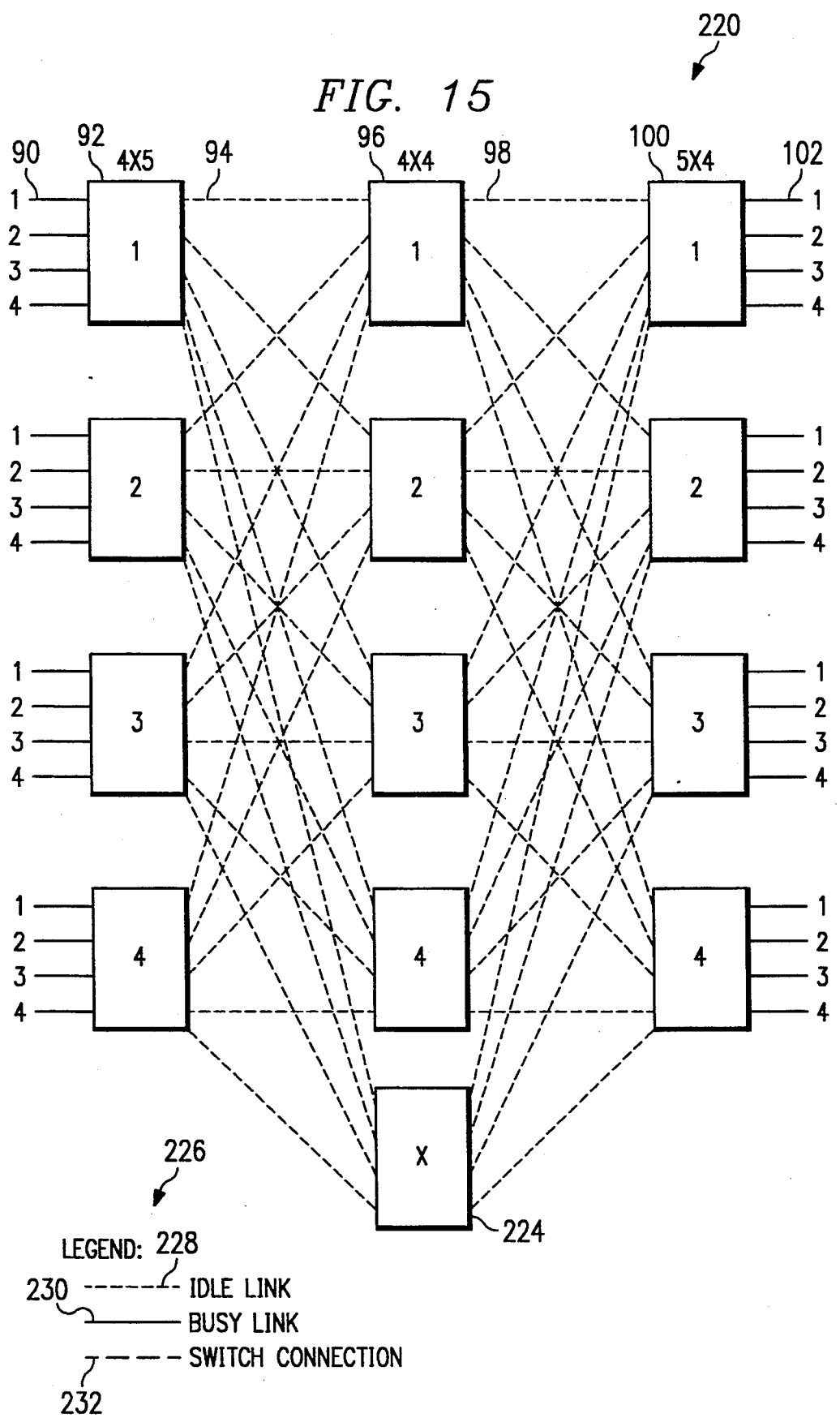

FIG. 15 illustrates the state of a simplified N(5,4,4) space matrix 220 after initialization. Note that the fifth center stage switch 224 is labeled X to indicate that it is the dedicated or extra center stage switch. As legend 226 shows, short-dashed lines 228 indicate an idle link, continuous line 230 indicates a busy link, and long-dashed line 232 shows a switch connection. Since there are no inputs connected to any outputs in FIG. 15, there are no input stage, center stage, or output stage switch connections and all of the links between the switches are idle.

With the simplified N(5,4,4) space matrix in mind, it is possible to detail how to implement computer software to accomplish the connection path selection and other purposes of the present invention. Note, however, that the size of space matrix 220 does not limit the utility or applicability of the software implementation. To assist in understanding the software implementation, the following discussion introduces data definitions and notations relevant in manipulating the matrices 222, 234, 236, 238, and 240 of FIG. 16. Note, also, that for ease in understanding connections, FIG. 15 uses the same reference numerals for input gates 90, input stage switches 92, etc. appearing in the generalized N(m,n,r) matrix of FIG. 3. The following data definitions are useful in the description of the present connection method and system.

In a software implementation, input/output gate or line conversions occur. For example, a connection may be requested in the form of IL-m→OL-n. In other words, input line m to output line n. The input line number is converted to an input switch stage number i and an input number for that input switch stage j such that IL-m→I(i,j). Similarly, the output line number is converted to an output switch stage number k and an output number for that output switch stage l such that OL-n→O(k,l). More formally, I(i,j) is determined from IL-m and O(k,l) is determined from OL-n by:

$$i = 1 + \text{Quot}_N(m-1)$$

$$j = 1 + \text{Rem}_N(m-1)$$

$$k = 1 + \text{Quot}_N(n-1)$$

$$l = 1 + \text{Rem}_N(n-1)$$

where
  N is the number of first (input) stage switches, which is equal to the number of third (output) stage switches;
  $\text{Quot}_N$ is the integer quotient of the argument divided by N; and
  $\text{Rem}_N$ is the integer remainder after the argument has been divided by N.

The following statements and data definitions may be understood with reference to FIGS. 15 and 16 to provide computer-generated matrices to accomplish the purposes of the present invention.

| Data Definition: | space_in_mat(in_stage,in_num) |
| --- | --- |

In FIG. 16, the space input matrix 222 for the FIG. 15 N(5,4,4) example is a 4×4 matrix which represents the connection of the input stage switches in the SSS such as switch 92. Each row of space input matrix 222 corresponds to one of the input stage switches 92. The columns of space input matrix 222 correspond to the input gates 90 to each of the first stage switches. The entries in the space input matrix correspond to the outputs of the first stage switches such as outputs 94. Since the output of each of the input stage switches is connected to the center stage switch of the same number, the entries in the space input matrix may be viewed as the center stage switch to which that particular input stage switch (row), input (column) is connected.

As a result, the statement

| Statement: | space_in_mat(i,j) = c |
|---|---| causes space input matrix 222 to indicate a connection from the $j^{th}$ input of the $i^{th}$ first stage switch to center stage switch c.

The entries in space input matrix 222 range from 0 to X using the simplified example of FIG. 15. A 0 indicates that no connection has been assigned. Entries of 1 through 4 are normal connections. A numerical entry in matrix 222 of 5, in this example corresponds to the entry of "X" in FIG. 6 and indicates that the extra center stage switch 224 has been assigned and the rearrangement process has been invoked.

| Data Definition: | space_cnt_mat[cnt_stage,in_stage] |
|---|---|

Space center matrix 234 is a 5×4 matrix which represents the connection map of the center switches in the space domain such as center stage switches 96. Each row of the space center matrix corresponds to one of the center stage switches 96. The columns of the space center matrix correspond to the inputs to each of the center stage switches such as inputs 94. The entries in the space center matrix correspond to the outputs of the center stage switches such as output 98. Since the output of each of the center stage switches 96 connects to the output stage switch of the same number, the entries in the space center matrix 234 may be viewed as the output stage switch to which that particular center stage switch (row), input column connects.

As a result, the statement

| Statement: | space_cnt_mat(c,j) = k |
|---|---| causes space center matrix 234 to indicate a connection from the $j^{th}$ input of the center stage switch "c" to the $k^{th}$ output stage switch. The entries in space center matrix 234 range from 0 to 4. A 0 indicates that no connection has been assigned. Entries of 1 through 4 are normal connections. A zero entry in $X^{th}$ row (i.e., the 5th row in this example) indicates that the extra center stage switch 224 has been assigned and the rearrangement process has been invoked.

| Data Definition: | space_out_mat[out_stage,out_num] |
|---|---|

Space output matrix 236 is a 4×4 matrix which represents the connection map of the output stage of the space matrix in the space domain. Each row of space output matrix 236 corresponds to one of the output switches such as output switch 100. The columns of space output matrix 236 correspond to the output from each of the output switches such as output gates 102. The entries in space output matrix 236 correspond to the input to which that output connects such as connections 98. Since the input of each output switch connects to the center stage switch of the same number, the entries in space output matrix 236 may be viewed as the center stage switch to which that particular output switch 100 (row), output gate 102 (column) connects.

As a result, the statement

| Statement: | space_out_mat(k,l) = c |
|---|---| causes space output matrix 236 to indicate a connection from center stage switch "c" to the $1^{th}$ output of the $k^{th}$ output stage switch. The entries in space output matrix range 236 from 0 to X. A 0 indicates that no connection has been assigned. Entries of 1 through 4 are normal connections. An entry of X (i.e., 5 in this example) indicates that extra center stage switch 224 as been assigned and the rearrangement process has been invoked.

Continuing with reference to FIGS. 15 and 16, the following discussion details how to implement the preferred embodiment to represent an idle link between an input gate and an output gate. In normal operation, the present connection method attempts to make a given connection through the lowest-numbered center stage switch. In order to make a connection from a given input stage switch, such as input switch 92, to a given output stage switch such as output switch 100, there must exist a certain center stage switch, such as center switch 96, with the property that there is an idle input link from input switch 92 to center switch 96 and an idle output link from center switch 96 to output switch 100.

The present method and system track idle input links and idle output links by using two different bit map arrays (one for input links and one for output links). Each bit array map has a separate row for each row of the space center matrices. The method uses a group of primitives to operate upon the bit maps to effect the connect and disconnect operations. The primitives, in turn, invoke the rearrangement process when required.

| Data Definition: | space_in_link[in_stage,cnt_stage] |
|---|---|

For the example of FIGS. 15 and 16, space input idle link bit map 238 is a 4×5 bit array that represents the idle input links 94 between the input switches 92 and the center switches 96 in the space domain. Each row of space input idle link bit map 238 corresponds to one of the input stage switches 92. The entries in space input idle link bit map 238 for a given row (input stage) and column (center stage) indicate the idle state of the input link 94 between that input stage and center stage. An entry of 1 indicates that the input link is idle and available for assignment. A 0 value indicates that the input link is in use and is not available for assignment. A 0 entry in column X indicates that the extra center stage switch 234 is in use and the rearrangement method is in progress.

| Data Definition: | space_out_link[out_stage,cnt_stage] |
|---|---|

Space output idle link bit map 240 is a 4×5 bit array that represents the idle output links between the output and the center switches 96 in the space domain. Each row of space output idle link bit map 240 corresponds to one of the output stage switches 100. The entries in the space output idle link bit map 240 for a given row (output switch) and column (center switch) indicate the idle state of the output link 98 between that output switch and center switch. An entry of 1 indicates that the output link is idle and available for assignment. A 0 value indicates that the output link is in use and is not available for assignment. A 0 entry in column X indicates that the extra center stage switch 224 is in use and the rearrangement method is in progress.

Having described the maps for representation idle links, the following describes primitive operations useful to manipulate the space idle link bit maps 238 and 240 for connect and disconnect operations.

| Primitive: | init_links() |
|---|---|

The initialize idle link bit maps primitive (used only for start-up operations) creates both space input idle link bit map 238 and space output idle link bit map 240 for the preferred embodiment. All entries in the idle link bit maps are initialized to 1, indicating that all links are idle.

| Primitive: | set_link(i/o, j, k) |
|---|---|

This primitive sets the $k^{th}$ bit of the $j^{th}$ row of the bit map specified by the "i/o" parameter to 1. If the bit map contains n elements and the value of j exceeds n, then the computer returns an error flag. Otherwise, the $k^{th}$ element is set to 1.

| Primitive: | clear_link (i/o, j, k) |
|---|---|

This primitive clears (resets) the $k^{th}$ bit of the $j^{th}$ row of the bit map specified by the i/o parameter to 0. If the bit map contains n elements and the value of j exceeds n then the computer returns an error flag. Otherwise, the $k^{th}$ element is set to 0.

| Primitive: | pump_link(space_in_link[i],space_out_link [k]) |
|---|---|

The preferred method and system connect between an input switch stage i and an output switch stage k using the lowest numbered center stage switch available. This is accomplished by a process that hereinafter shall be called "pumping" space_n_link[i] and space_out_link[k]. That is, space_in_link[i] is logically "ANDed" with space_out_link[k] to determine c, the lowest numbered center stage switch with both an idle link to input stage i and an idle link to output stage k. The index of the first non-zero entry in the result of the logical AND is c, the lowest numbered center stage switch with both an idle link to input stage i and an idle link to output stage k. The two links to c are then marked as "busy" in space_in_link[i] and space_out_link[k] and the center stage number c is returned. Table 3 illustrates an embodiment of this primitive macro.

TABLE 3
PUMP LIST MACRO FLOW CHART

```
pump_link(space_in_link[1], space_out_link[k]
int c, i, k, x[xtra_stage];
{
int j;
x = space_in_link[i] && space_out_link[k];
for (j = 1; j < = xtra_stage; j++0
{
if (X[i] ==1)
{
```

TABLE 3-continued
PUMP LIST MACRO FLOW CHART

```
c = j;
break;
}
}
clear_link(space_in_line, i,c);
clear_link(space_out_link, k, c);
if (c == xtra_stage)
{
rearrange = 1;
]
return(c);
{
```

FIG. 16 illustrates the implementation data matrices after initialization. The corresponding entries in the connection path selection matrices space_in_mat 22, space_cnt_mat 234, and space_out_mat 236, for the example, are illustrated in FIG. 16. Since there are no switch connections, all of the entries are 0. The contents of the space_in_link 238 and space_out_link 240 bit maps are as shown at initialization. Note that each input stage switch and each output stage switch has a 1 element for each idle center stage switch. In this example, after initialization, all five center stage switches are marked as "idle".

Figure 17:
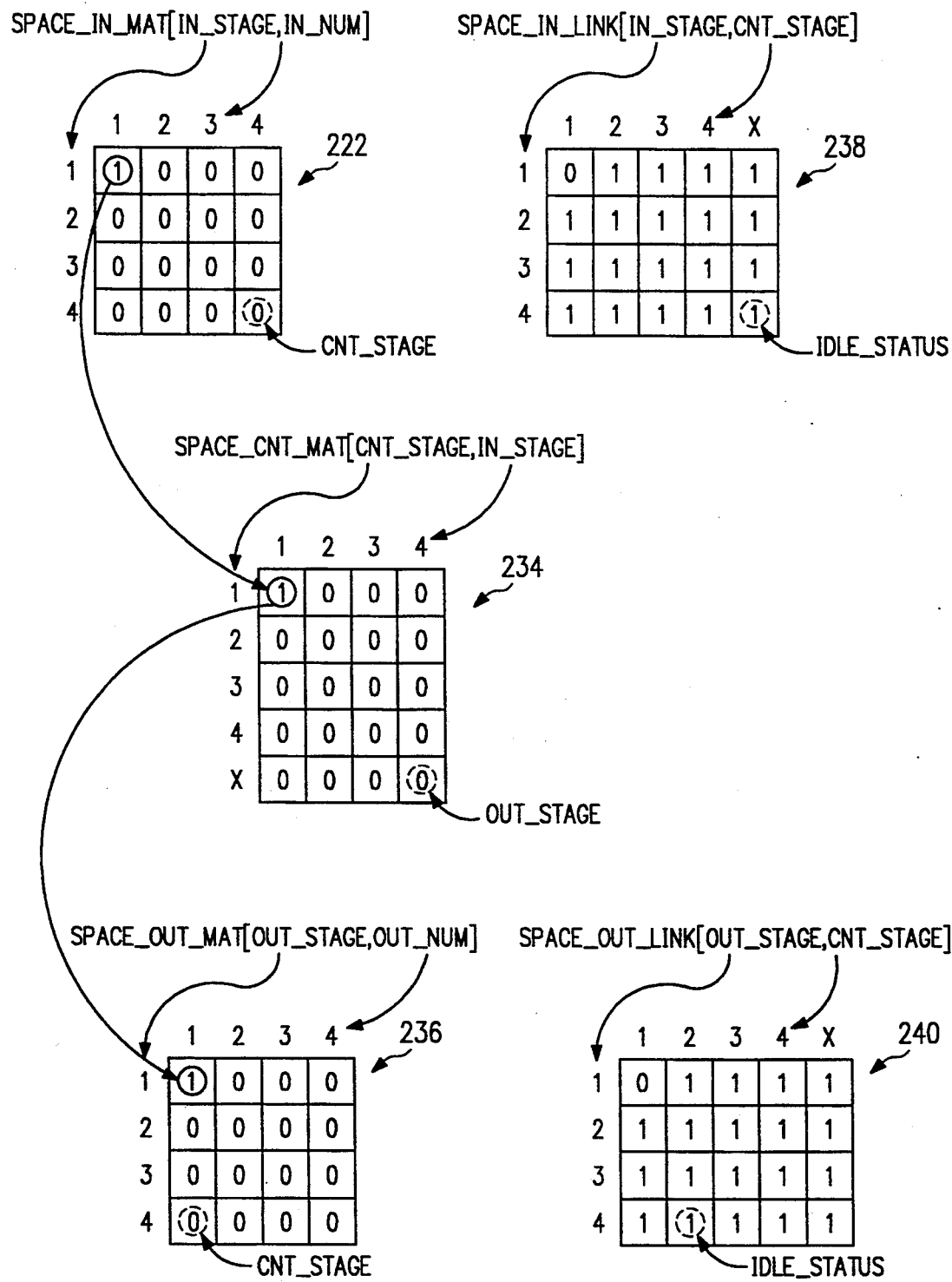

FIG. 17 shows the implementation data after the first connection. Suppose the first connection requested is to connect input line 1 to output line 1, or more simply, IL-1→OL-1. The first step is to convert the input line number to an input switch stage number and an input number for that input switch stage. In this case, IL-1→I(1,1). Similarly, the output line number is converted to an output switch stage number and an output number for that output switch stage. In this case, OL-1→O(1,1). So, we are going to make a connection between input stage 1 and output stage 1.

Figure 18:
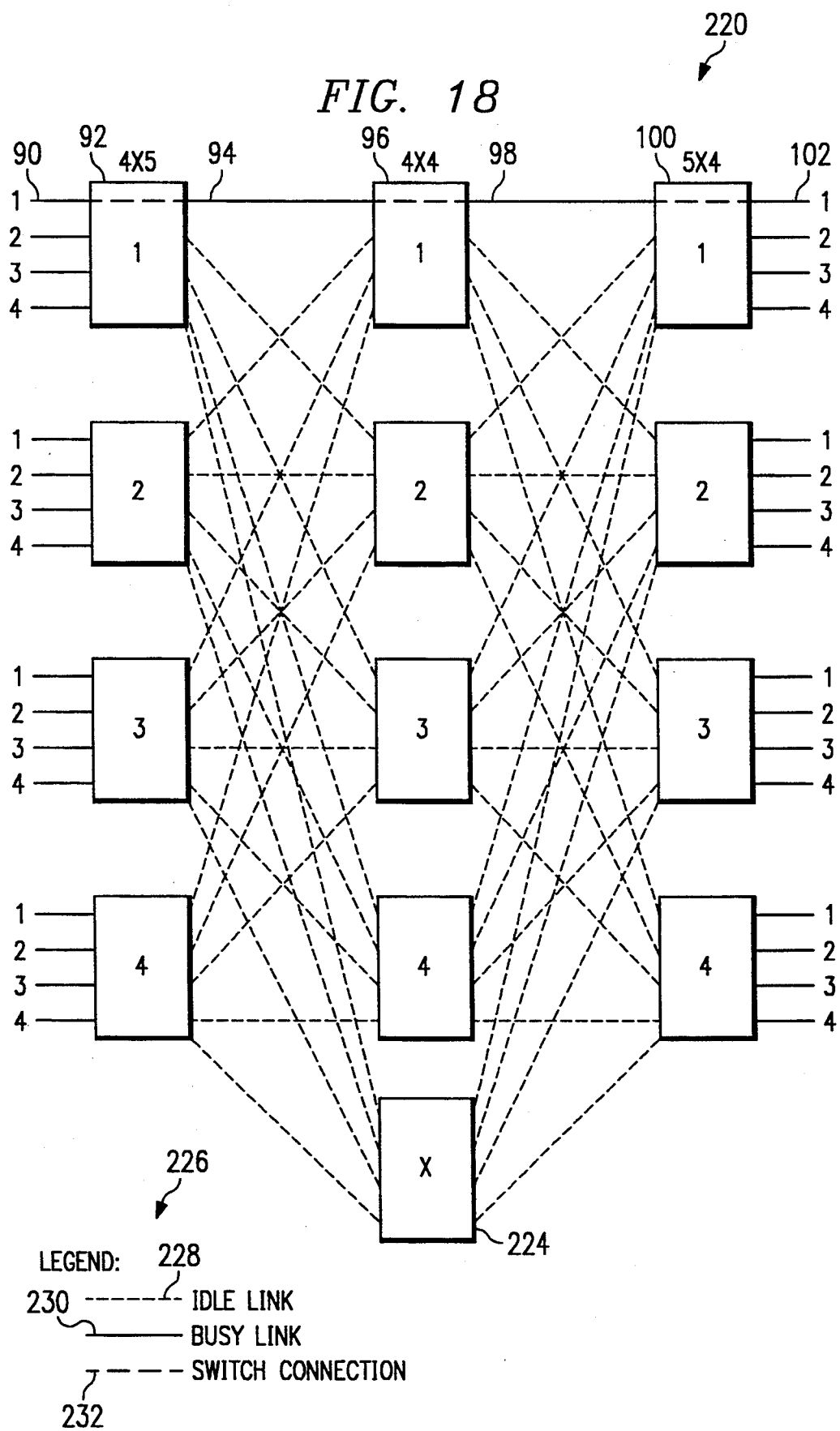

The present method and system attempt to make the connection between input stage 1 and output stage 1 by using the lowest numbered center stage switch available, which in this case is center stage 1. This is accomplished by using the pump_list macro of TABLE 3 to compare space_in_link[1] with space_out_link[1] in FIG. 16 and set the idle connects of the lowest center stage number common to both bit maps to "0". Then, the space_in_mat(i,j) and the space_out_mat(k,l) are set equal to that center stage number, and the space_cnt_mat(c,j) is set equal to k. The corresponding space matrix data entries are shown in FIG. 17 and the resultant state of the space matrix 220 is shown in FIG. 18.

The following statements accomplish this process:

TABLE 4
CONNECT STATEMENTS

```
x = pump_list(space_in_link[i], space_out_link[k]);
   space_in_mat(i,j) = c;
   space_cnt_mat(c,i) = k;
   space_out_mat(k,l) = c;
where, in this case, i=j=k=l=m=c-1.
```

Figure 19:
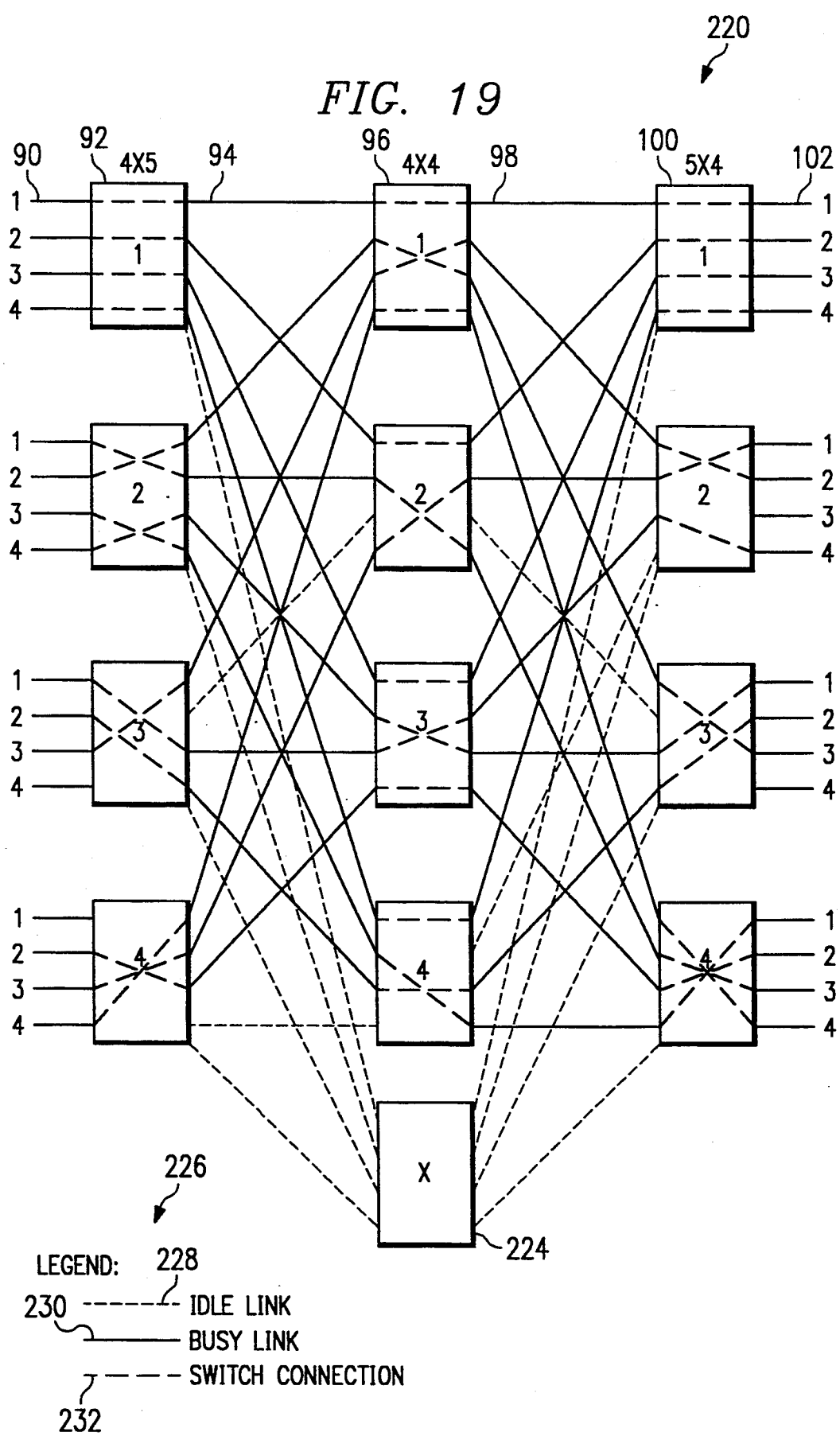
Figure 20:
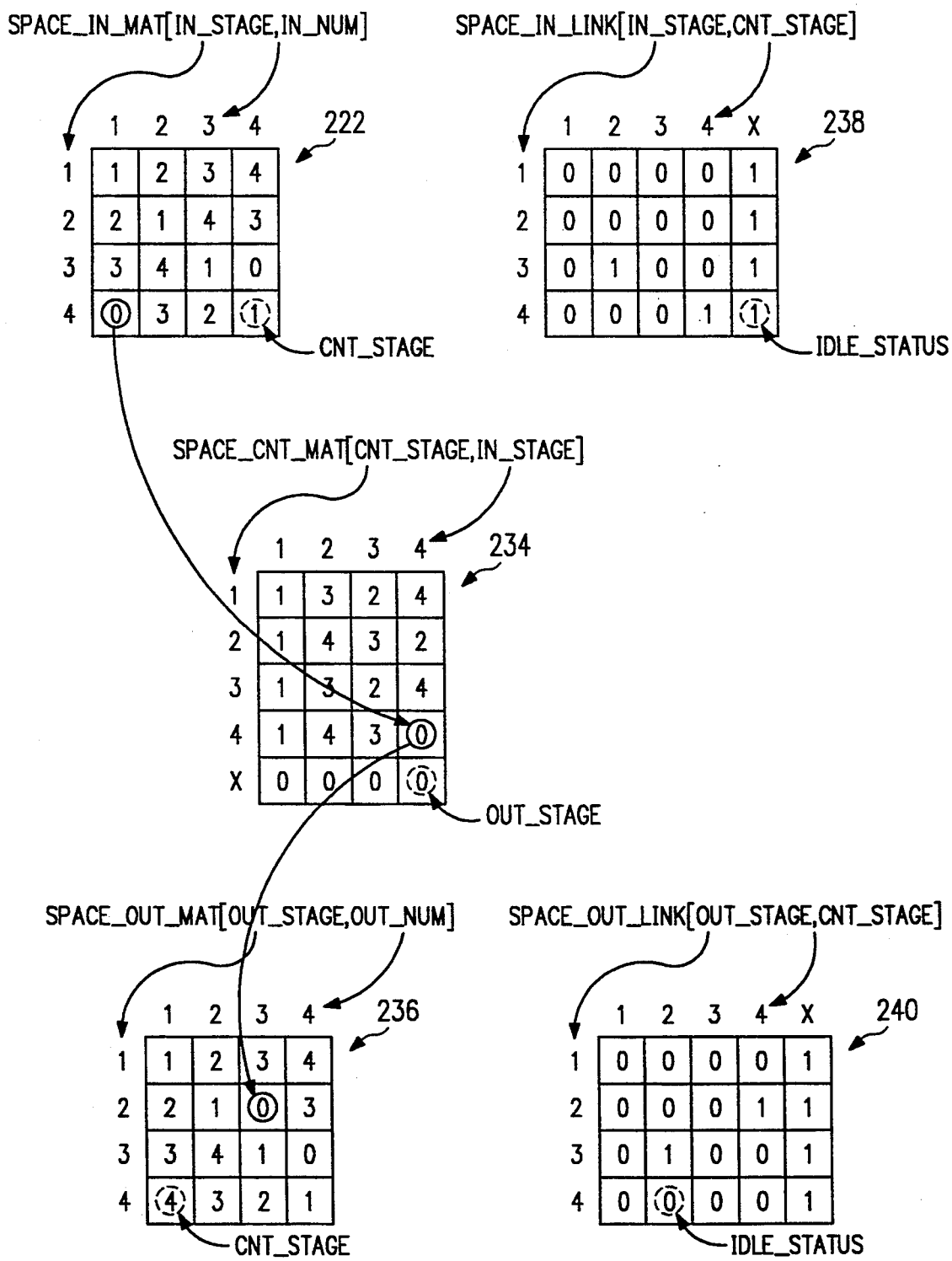

Assume the procedure of adding connections continues until $n^2-2$ connections have been made (presumably without rearrangement) with the resultant space matrix shown in FIG. 19 and connection path selection matrix data shown in FIG. 20.

Then, the request to connect IL-13 to OL-7 is received. The request to connect IL-13 to OL-7 converts to a request connect I(4,1)→O(2,3). The present method and system attempt to make the connection between input stage 4 and output stage 2 by using the lowest numbered center stage switch available, which in this case, is center stage switch number 4, as illustrated in FIG. 20. The pump__list macro of Table 1 compares space__in__link[4] with space__out__link[2], determines the lowest center stage number common to both bit maps, and sets the idle status to "busy" in both bit maps. Then the space__in__mat(i,j) and the space__out__mat(k,l) are set equal to that center stage number and the space__cnt__mat(c,j) is set equal to k.

Figure 21:
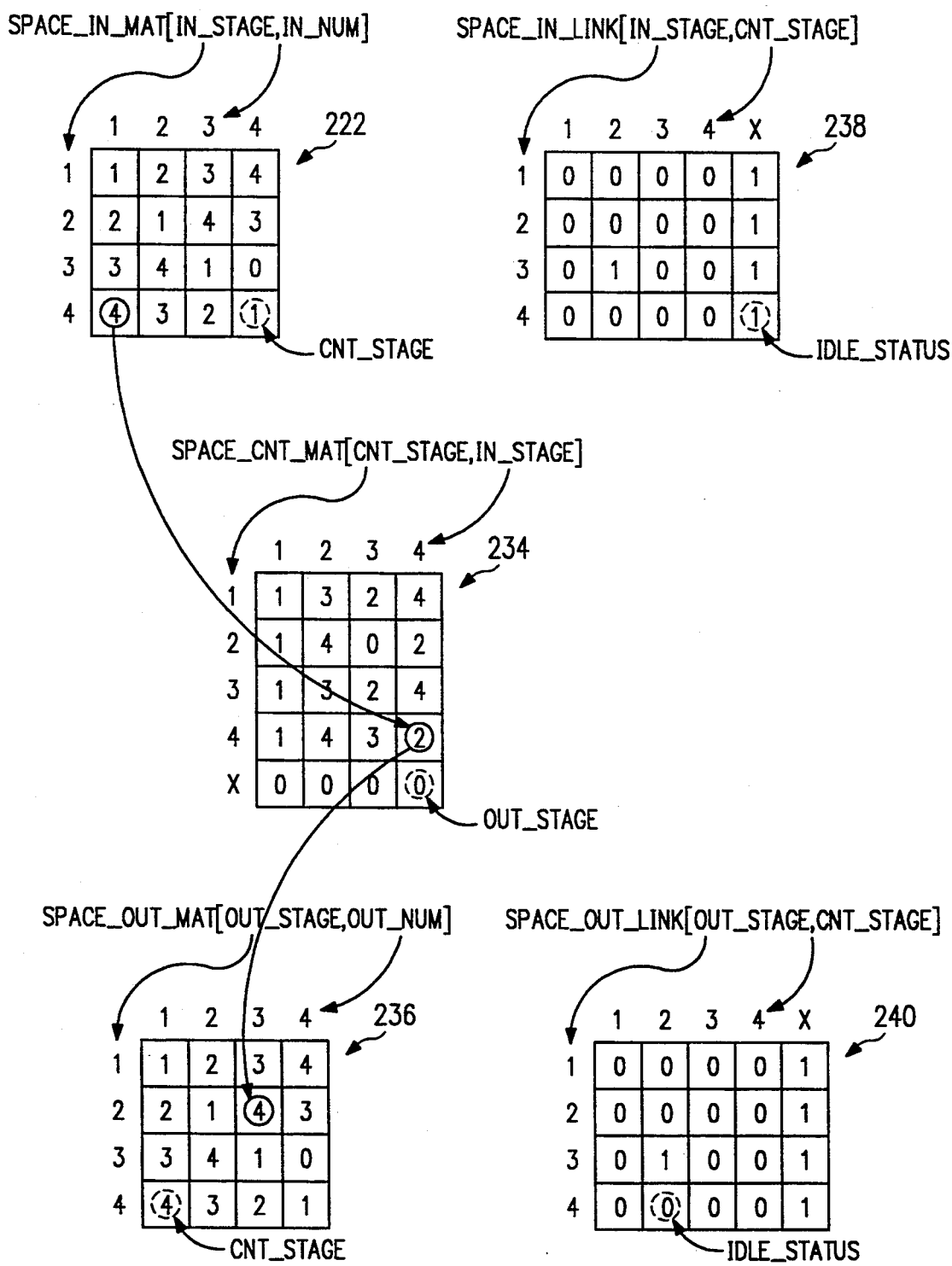
Figure 22:
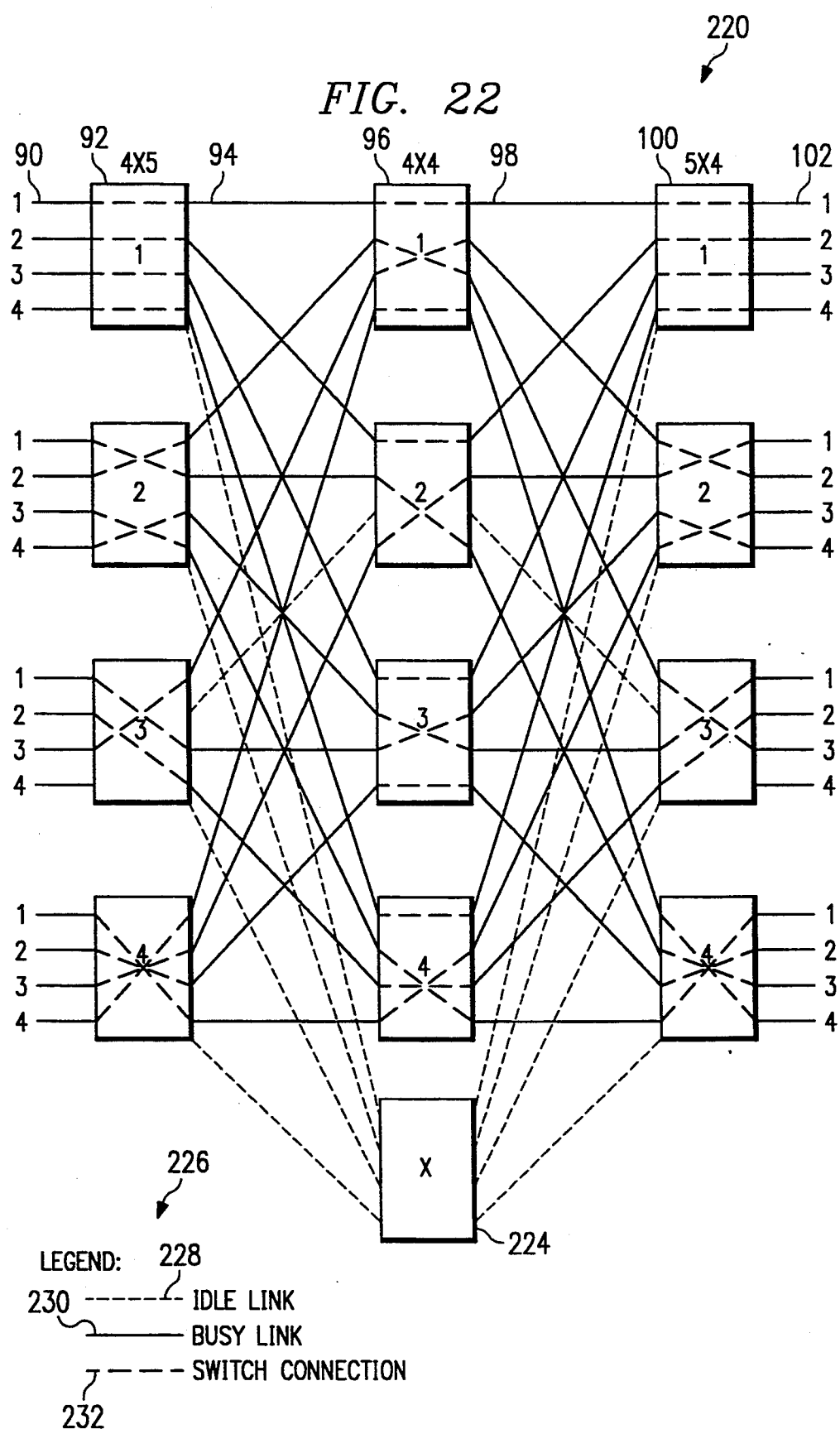

The corresponding space matrix data entries are shown in FIG. 21 and the resultant state of the space matrix is shown in FIG. 22. This process is accomplished using the following statements from the connect routine as before:

TABLE 5

CONNECT STATEMENTS x = pump__list(space__in__link[i], space__out__link(k]);
   space__in__mat(i,j) = c;
   space__cnt__mat(c,i) = k;
   space__out__mat(k,l) = c;
where in this case, i=4 j=1 k=2 l=3 m=13 n = 7 and c=4.

Suppose the next request is to disconnect IL-13 from OL-7 (which takes down the connection that was just made). The request to disconnect IL-13 from OL-7 converts to a request to disconnect $I(4,1) \rightarrow O(2,3)$. The put__back macro accomplishes the disconnect by breaking the connection between input stage 4 and output stage 2 and putting the freed-up center stage switch, number 4, back on the input/output stacks for subsequent use. More specifically, the put__back macro determines the freed-up center stage switch number and puts it back in the proper positions on both of the ordered-linked lists in space__in__link[4] and space__out__link[2]. Then, the space__in__mat(i,j), the space__cnt__mat(c,j), and the space__out__mat(k,l) are set equal to 0.

Figure 23:
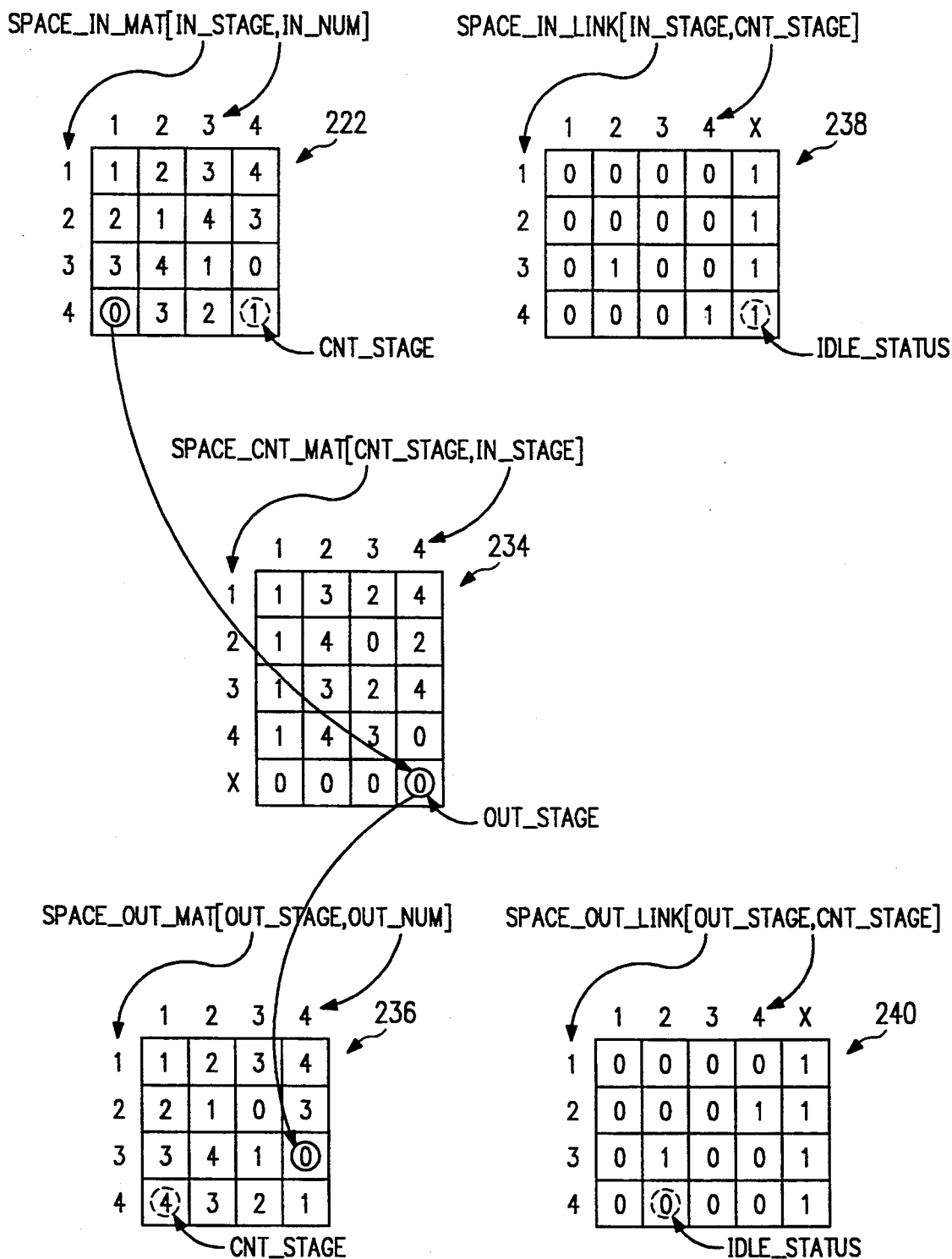

The corresponding space matrix data entries are shown in FIG. 23 and the resultant state of the space matrix is same as shown before FIG. 18. The disconnect is accomplished using the following statements from the put__back macro:

TABLE 6

DISCONNECT STATEMENTS c = space__in__mat (i,j);
   set__link(space__in__link, i, c);
   set__link(space__out__link, k, c);
   space__in__mat(i,j) = 0;
   space__cnt__mat(c,i) = 0;
   space__out__mat(k,l) = 0;
where in this case, i=4 j=1 k=2 l=3 m=13, n=7, and c=4.

Figure 25:
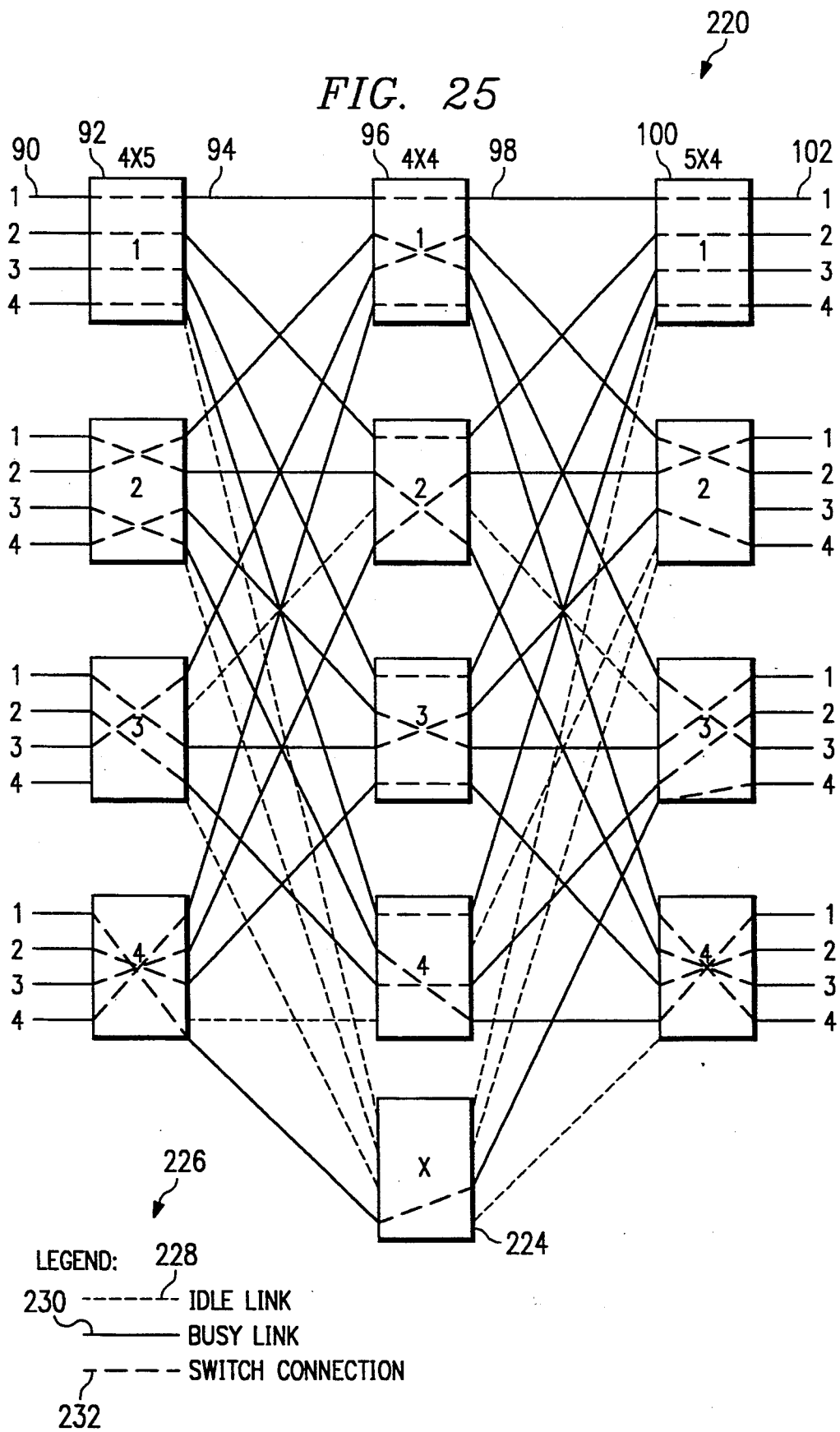

Next, suppose we receive a request to connect IL-13 to OL-12. The request to connect IL-13 to OL-12 converts to a request to connect $I(4,1) \rightarrow O(3,4)$. The present method and system attempt to make the connection between input stage 4 and output stage 3 by using the lowest numbered center stage switch available. In this case, the $X^{th}$ or extra center stage switch 224 is the lowest number available center stage switch, as illustrated in FIG. 25.

Figure 24:
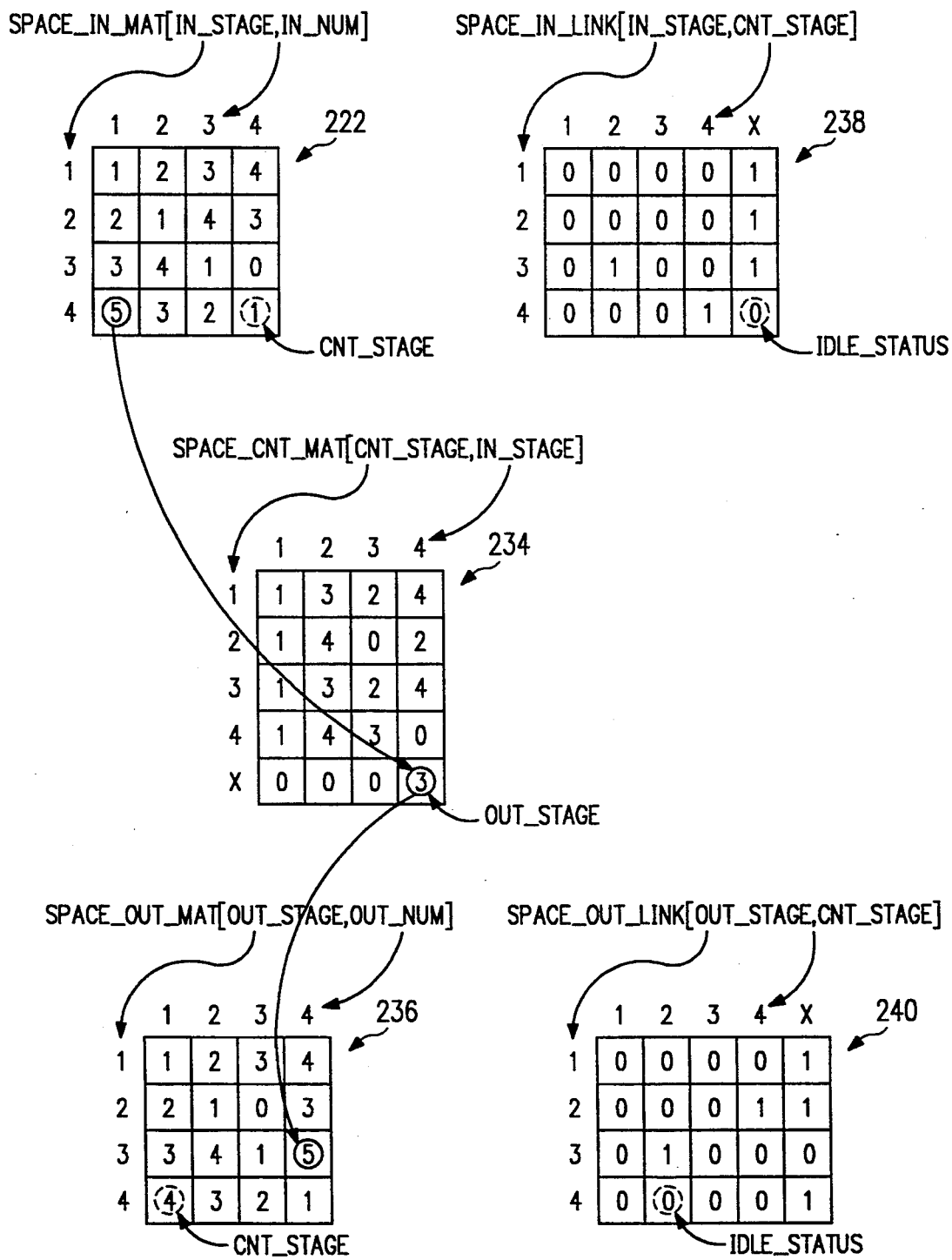

As before, the pump__list macro accomplishes this by comparing space__in__stack[4] with space__out__stack[3] in FIG. 23, determining the lowest center stage number common to both bit maps (which in this case is center stage switch "X"), and setting the idle status to "busy" in both bit maps. Then, the space__in__mat(i,j) and the space__out__mat(k,l) are set equal to that center stage number and the space__cnt__mat(c,j) is set equal to k. An entry of 5 indicates that the $X^{th}$ center stage switch has been assigned and the rearrangement process is automatically invoked. The corresponding space matrix data entries during rearrangement are shown in FIG. 24 and the resultant state of the space matrix during arrangement is shown in FIG. 25.

The following immediate connect statements accomplish this:

TABLE 7

IMMEDIATE CONNECT STATEMENTS x = pump__list(space__in__stack[i],space__out__stack[k]);
   space__in__mat(i,j) = c;
   space__cnt__mat(c,i) = k;
   space__out__mat(k,l) = c;
where in this case, i=4 j=1 k=3 l=4 m=13, n=12, and c=5.

Figure 26:
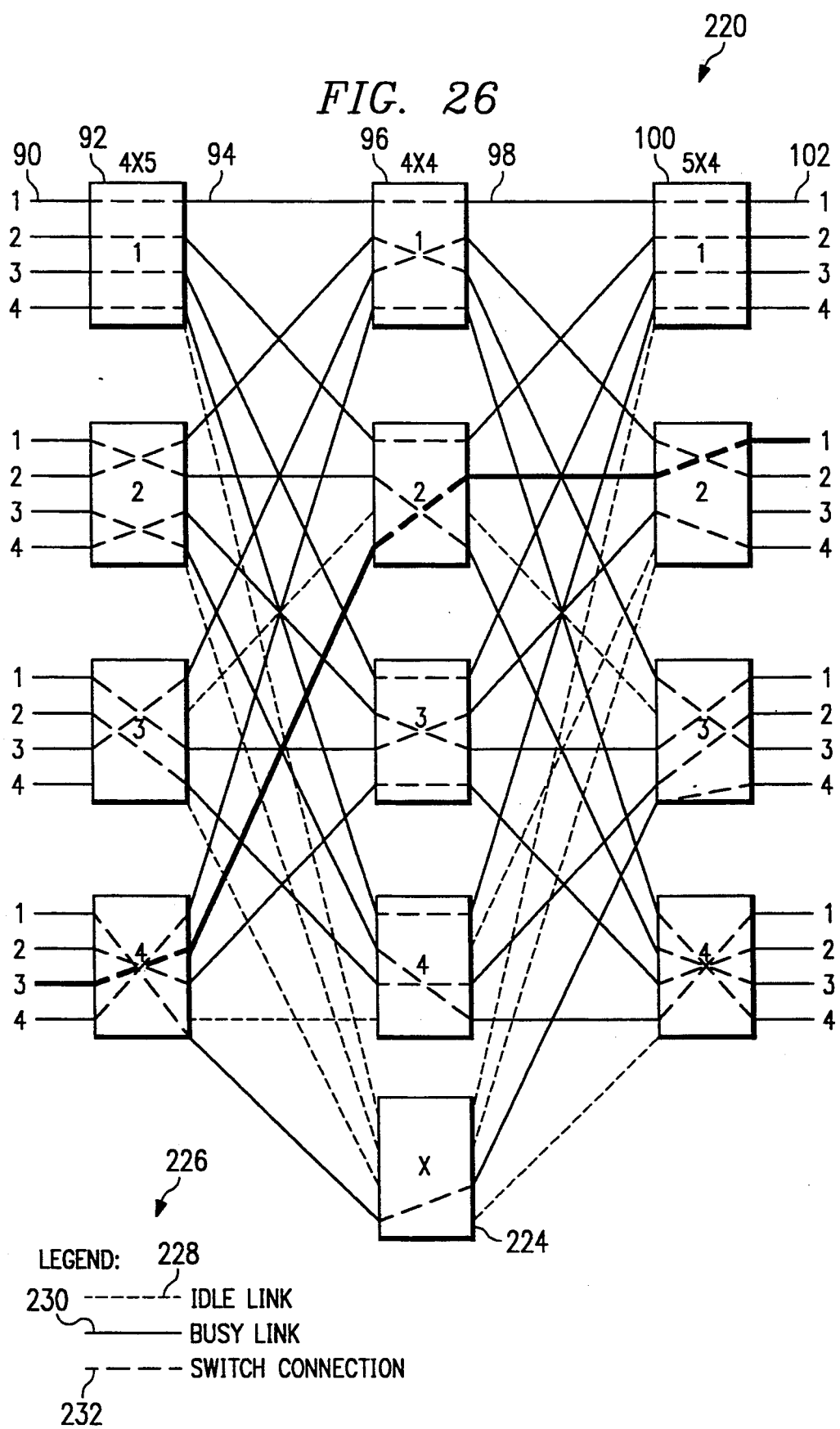
Figure 27:
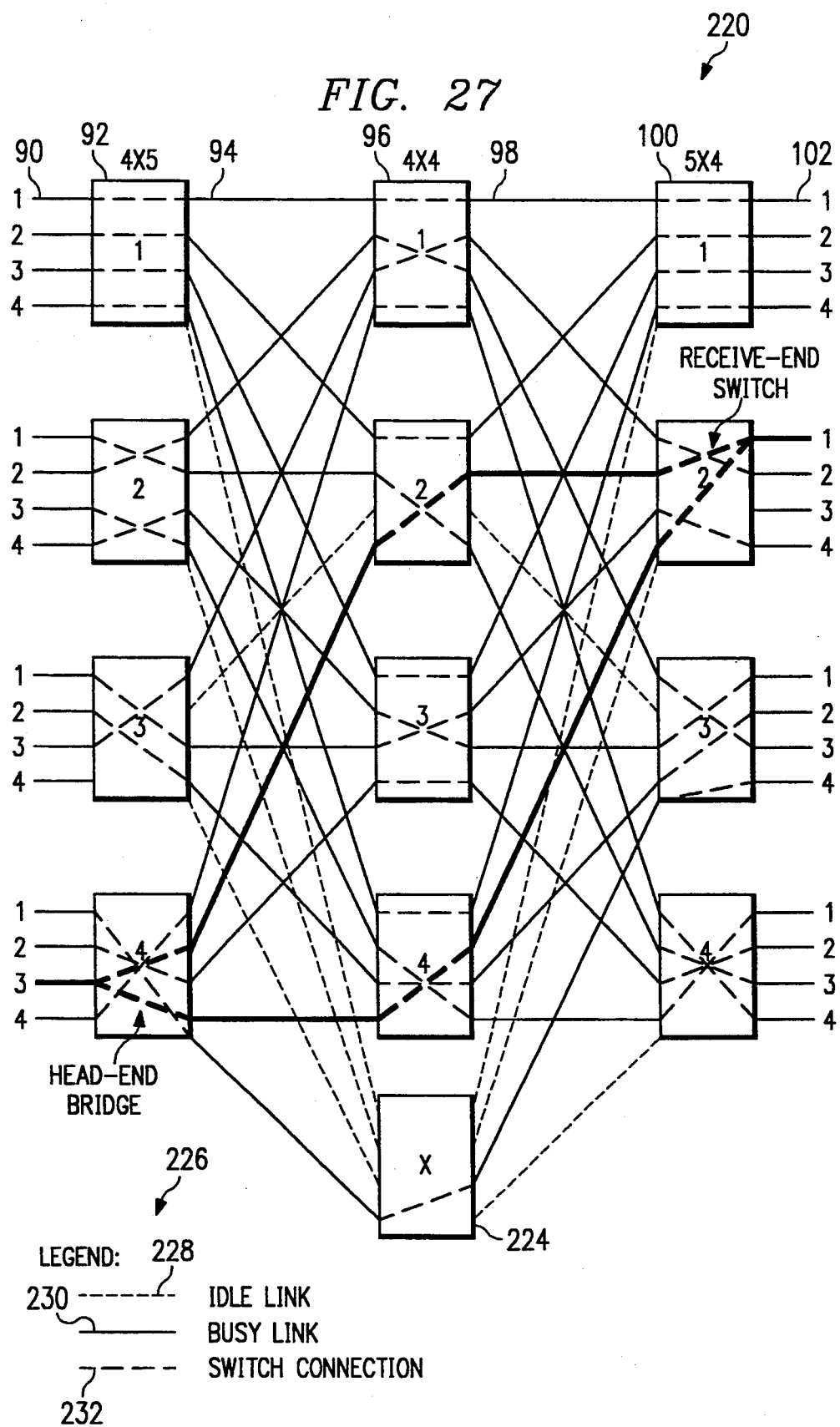
Figure 28:
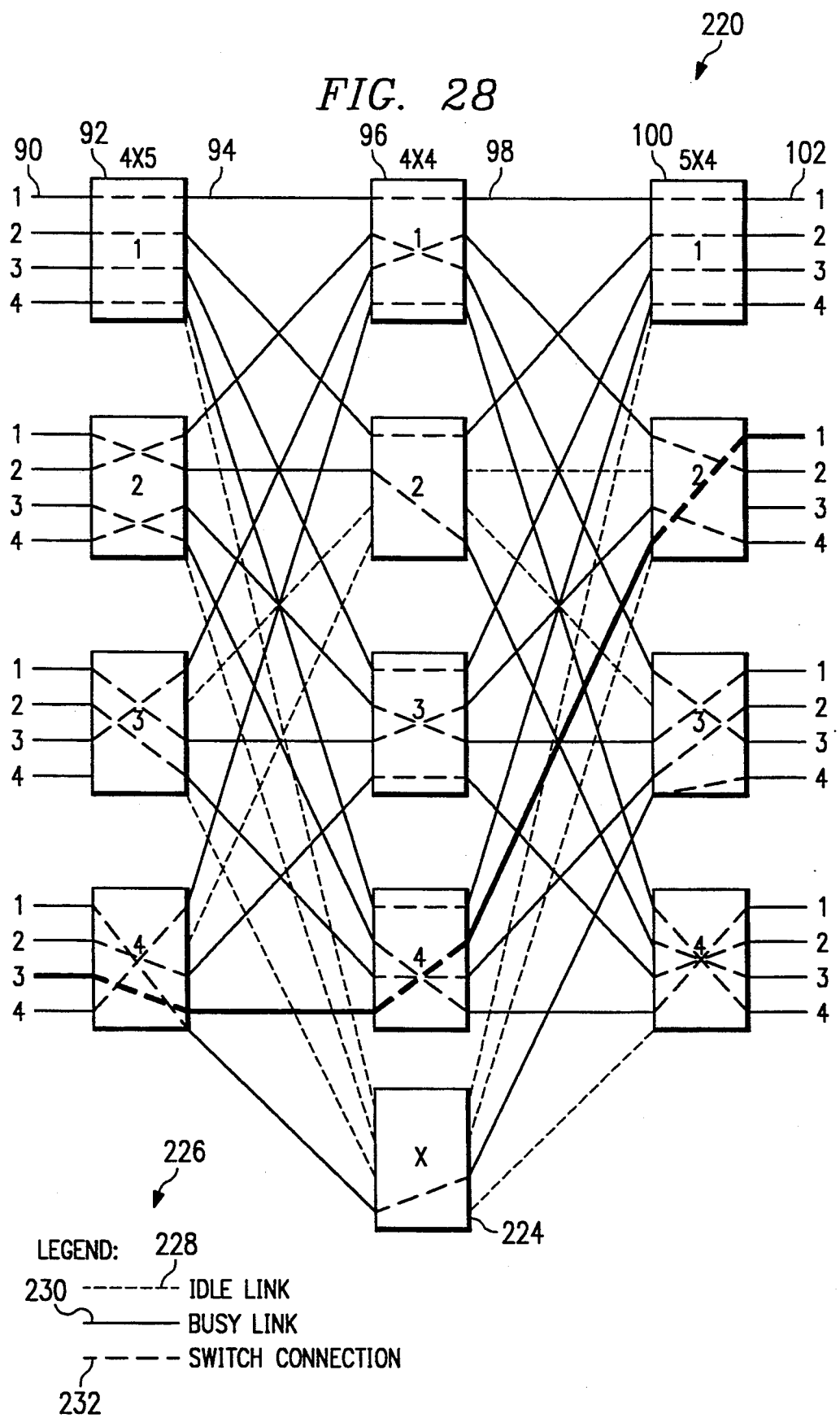
Figure 29:
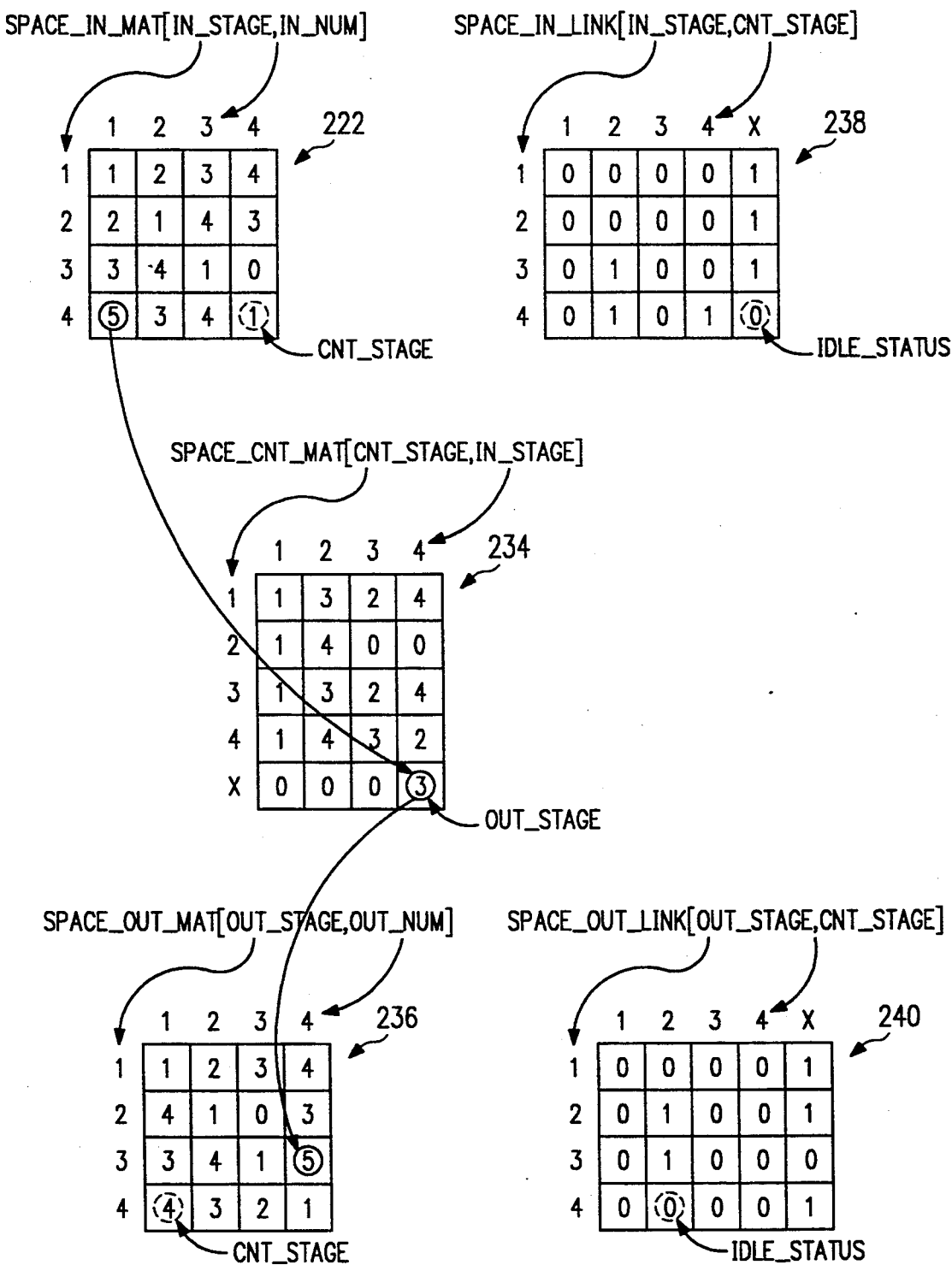
Figure 30:
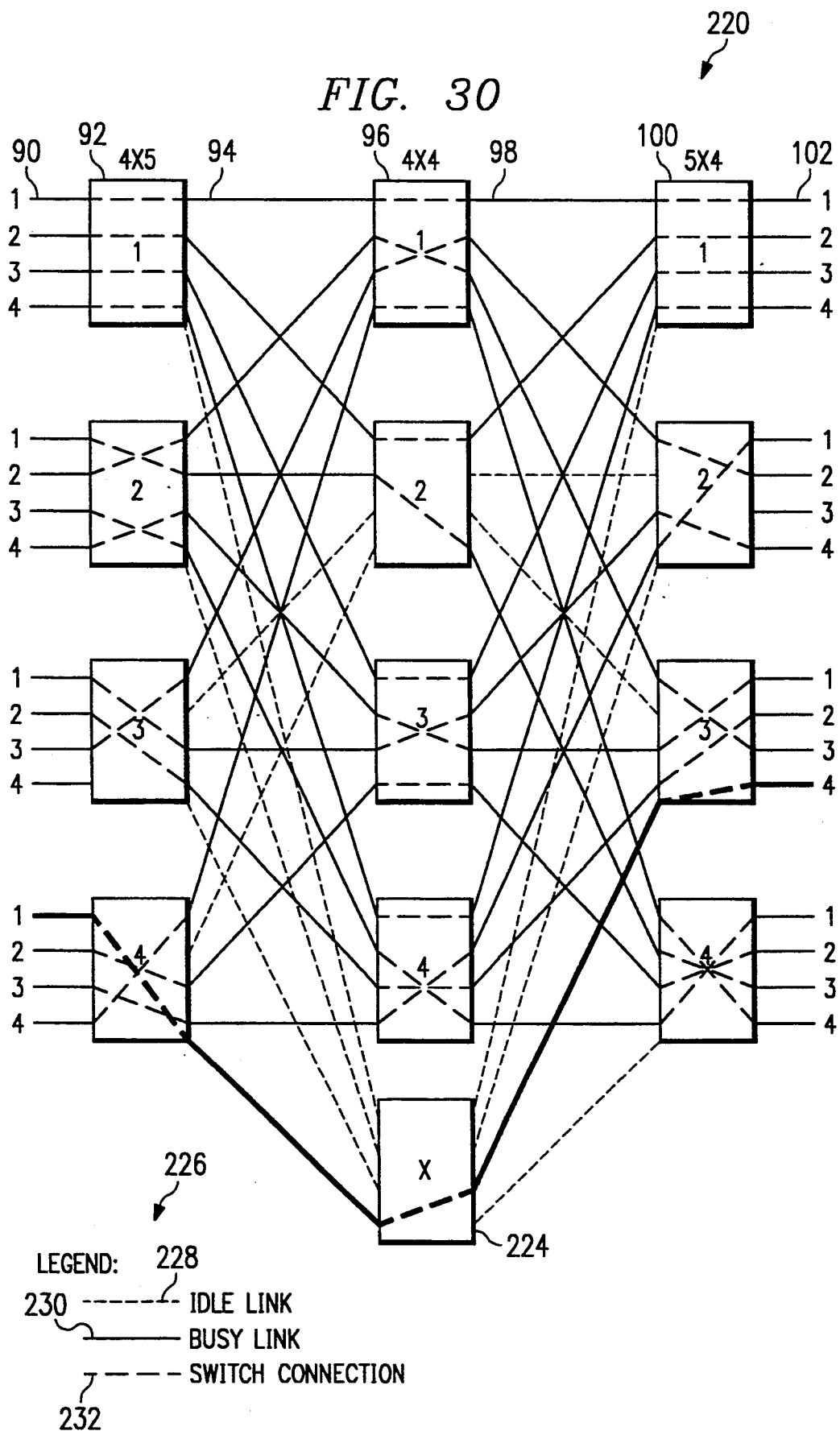

As a result of the rearrangement algorithm the connection $I(4,3) \rightarrow O(2,1)$ that FIG. 26 shows is "rolled" from center stage switch number 2 onto center stage switch number 4. This roll is performed hitlessly by creating a head-end-bridge at input stage switch 4 and a receive-end-switch at output stage switch 2 as shown in FIG. 27. When the correct path is received at output stage switch 2 from center stage switch 4, the original connection through center stage switch 2 is dropped as shown in FIG. 28 and the space matrix data is updated as shown in FIG. 29.

Figure 31:
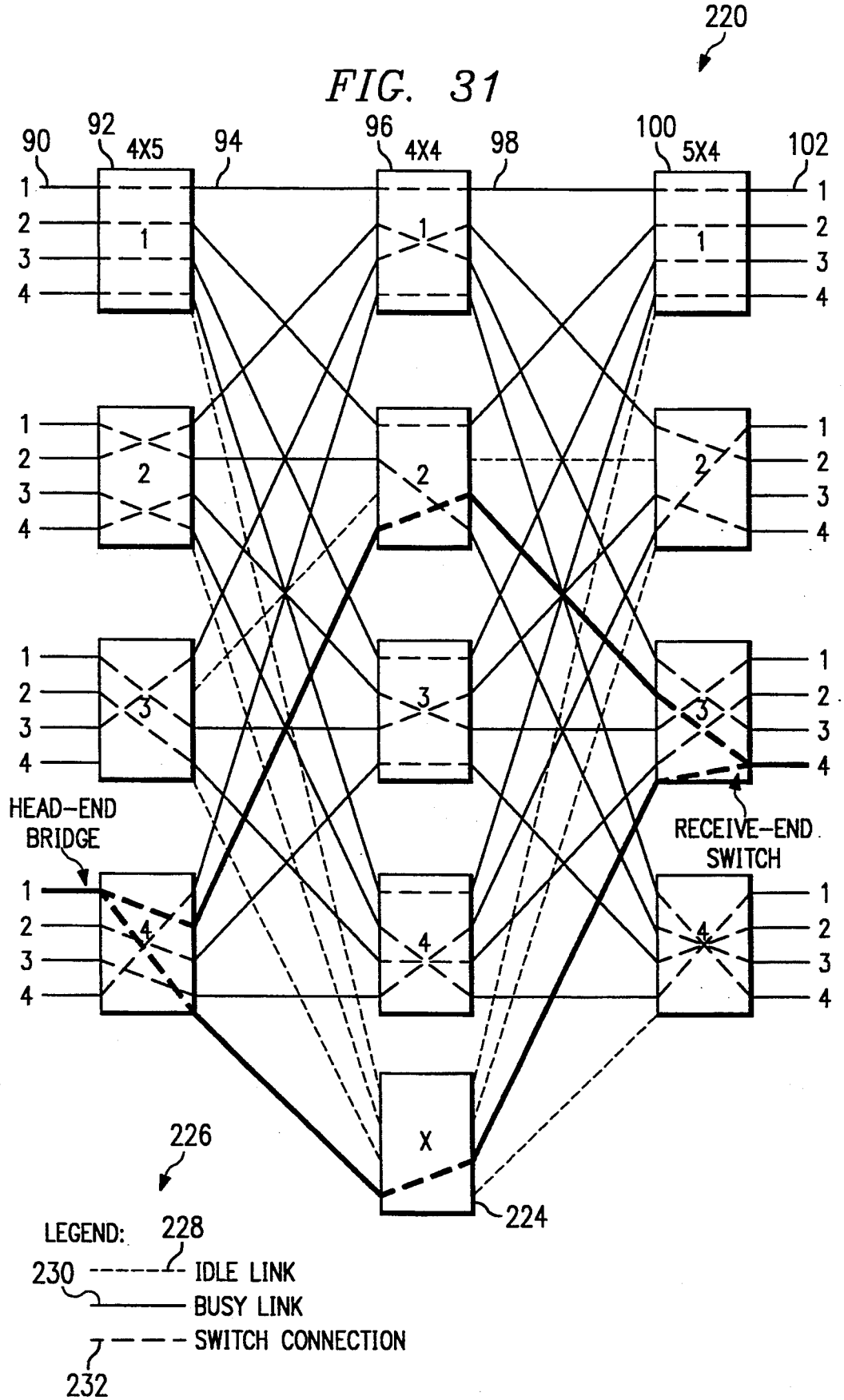

The previous roll now allows the immediate connection, $I(4,1) \rightarrow O(3,4)$, as FIG. 31 shows, which is on center stage switch X 224, to be rolled onto center stage switch 2.

This roll is performed hitlessly by creating a head-end-bridge at input stage switch 4 and an receive-end-switch at output stage switch 3 as shown in FIG. 31. When the correct path is received at outputs stage switch 3 from center stage switch 2, the original connection through center stage X 224 is dropped.

Figure 32:
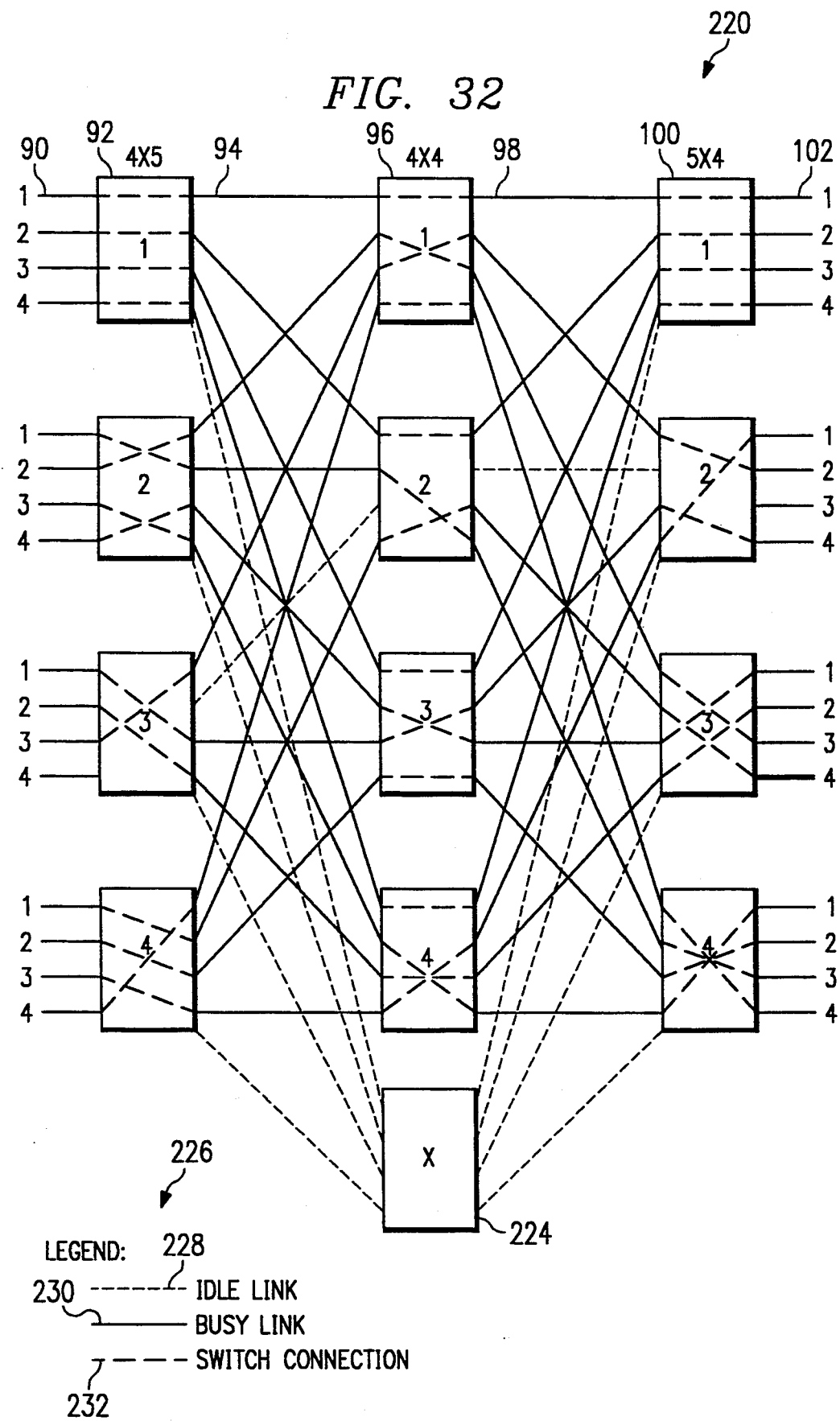
Figure 33:
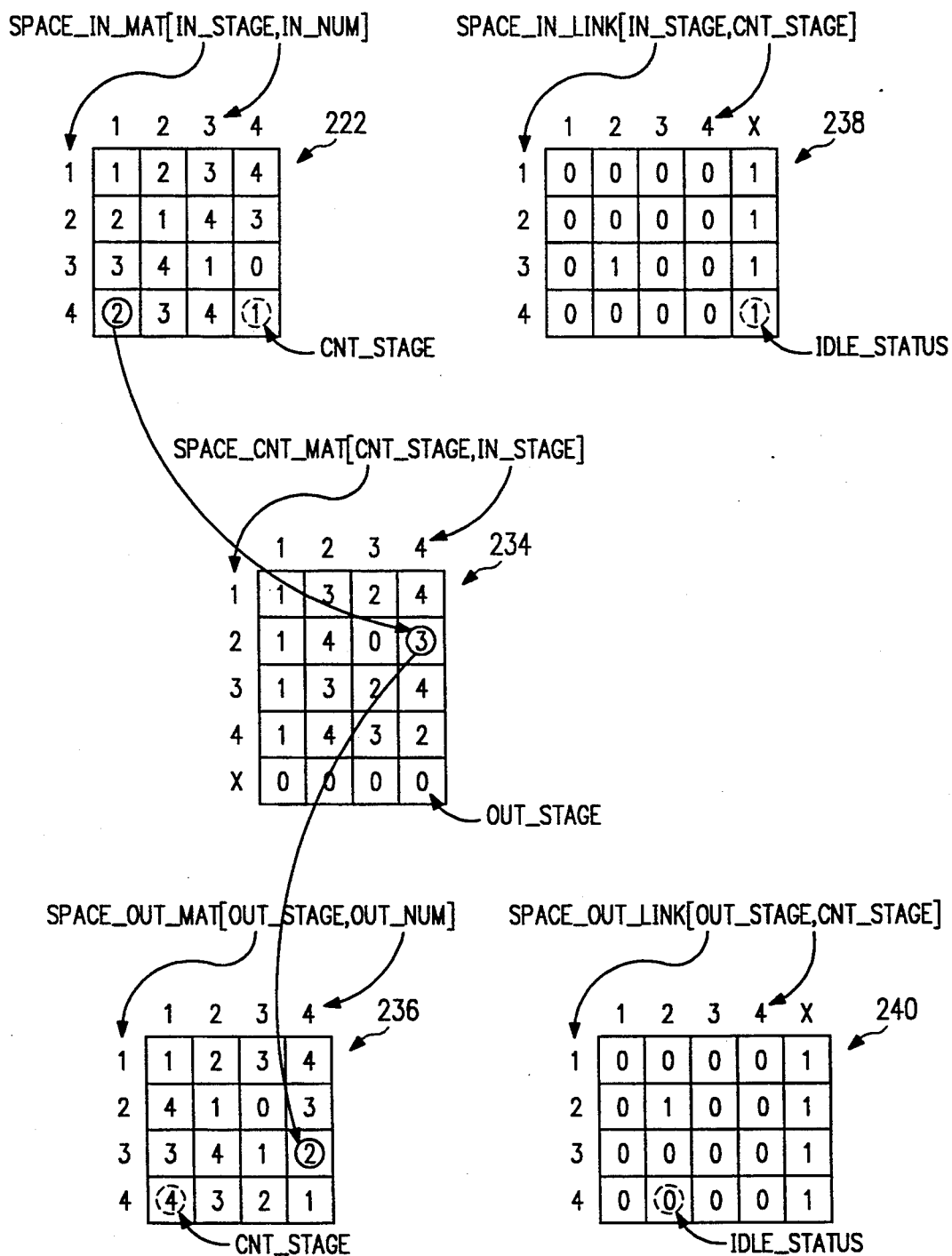

Rolling the immediate connection, $I(4,1) \rightarrow O(3,4)$, off the extra center stage switch completes the rearrangement process for this connection. Note that this process leaves the extra center stage switch clear and ready for a next connection when a rearrangeable blocking condition occurs. FIG. 32 shows the resulting state of the space matrix after rearrangement. FIG. 33 shows the corresponding space matrix data entries after rearrangement.

Figure 34:
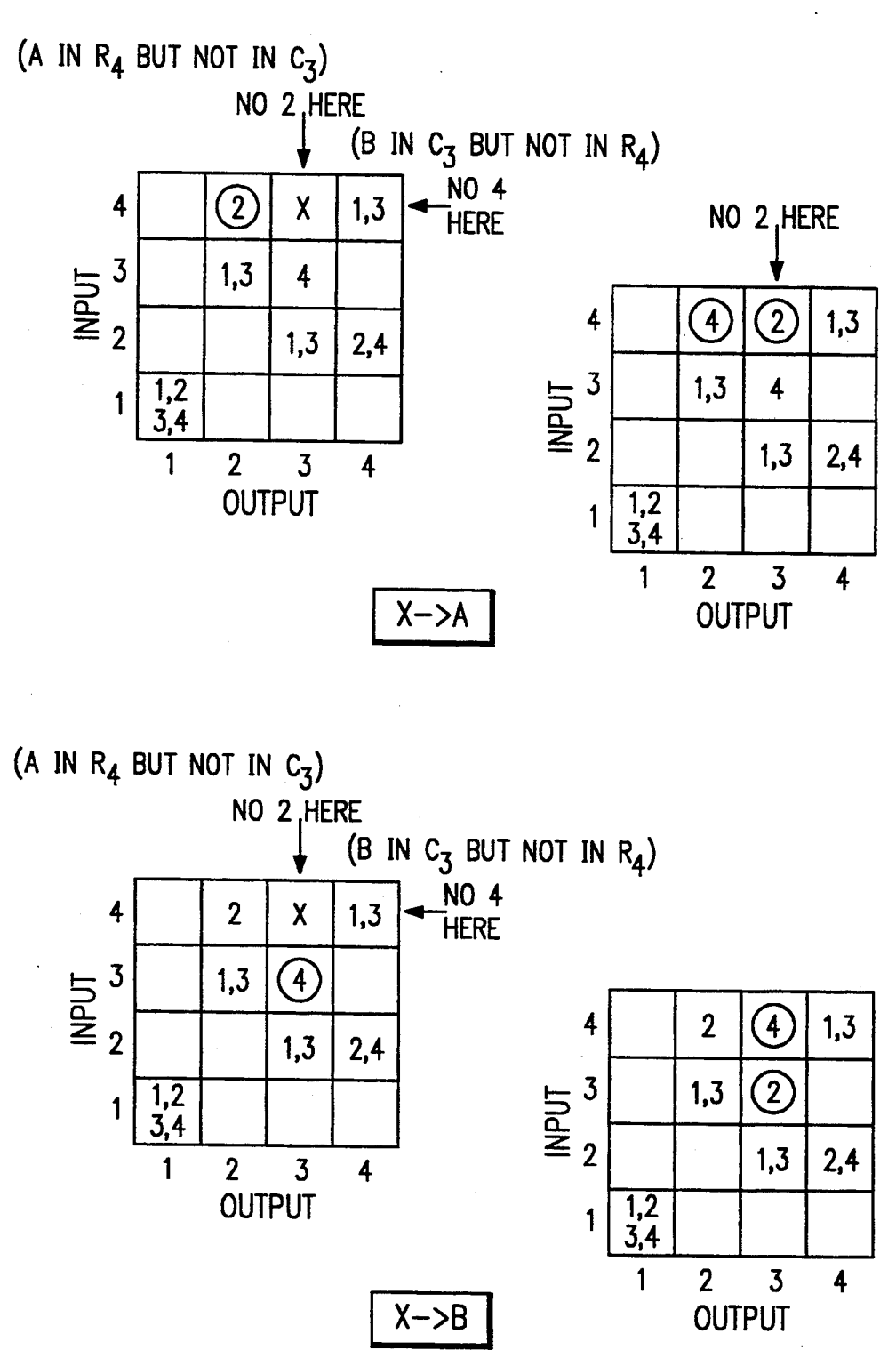

In FIG. 34, the rearrangement aspects of the preferred embodiment are applied to the above example appear. Once the preferred embodiment uses dedicated center stage switch 224 to make the immediate connection, the system of the preferred embodiment invokes the rearrangement process automatically. First, the system determines two center stage switches which will participate in the rearrangement process. This is accomplished using Paull's Method which is restated as follows:

If $(r_1, c_1)$ is blocked, test all symbol pairs (A,B), such that A is in row $r_1$, but not in column $c_1$ and B is in $c_1$, but not in $r_1$, to find which pair will require the fewest changes. The method then carries out the changing algorithm on that pair.

Returning to the space matrix example of FIG. 25, it is preferred to first transform the space_cnt_mat matrix data in FIG. 24 into the format of FIG. 4. FIG. 34 illustrates the results of this transformation.

The use of the dedicated center stage switch is indicated by the X in ($r_4,c_3$) of FIG. 34. The next step is to find all symbol pairs (A,B) such that A is in row $r_4$, but not in column $c_3$, and B is in column $c_3$, but not in row $r_4$. In this example, there is a 2 in row $r_4$, but no 2 in column $c_3$, so A is set to 2. Similarly, there is a 4 in column $c_3$, but no 4 in row $r_4$, so B is set to 4. Since there is only one value for A and one value for B, the (A,B) pair that requires the least changes is, obviously, the pair (2,4).

For a given pair of symbols (A,B) there are two possible rearrangement sequences. One of these two generally will be shorter. The following steps generate the X→A and X→B sequences for this example.

The X→A sequence starts with the immediate connection through the extra element and ends up with the blocked cell being assigned to element A or 2, in this case. Starting with the blocked cell ($r_3,c_4$), there is no 4 in row $r_3$, so this step requires a circle around the 2 in row $r_3$. Now, the circled 2 is in ($r_4,c_2$). Then, a search for a 4 in column $c_2$ is necessary. Since there is none, this sequence is complete. (Note that not all 2's get circled.)

The X→B sequence starts with an immediate connection through the dedicated element 224 and ends up with the blocked cell being assigned to element B or 4, in this case. Starting with the blocked cell ($r_3,c_4$), there is no 2 in $c_4$, so a circle goes around the 2 in $c_4$. Now, the circled 4 is in ($r_3,c_3$). Then, a search for a 2 in $r_3$ takes place. Since there is none, the sequence generation process is complete. (Note that not all 4's get circled.)

The flooding algorithm starts by finding the first element of the X→A sequence. If the X→A sequence is not ended, the first element of X→B sequence is found. Then, if the X→B sequence is not ended, the next element of the X→A sequence is found. This process continues until the shorter of the two sequences is completed. (So, the X→B sequence shown in FIG. 34 is not really generated. It is shown here as an illustration of the alternate path.)

In summary, a method and system are provided for finding an optimal path or connection configuration through a communications matrix in which an input stage array represents the assignment of input gates through an input switch to a center stage and has values that associate an input stage switch with an input gate and a center stage switch, a center stage array represents center stage switch connections between an output stage and input stage, and an output stage array represents output stage connections and has values that associate an output stage switch with an output gate and a center stage switch, and, further, wherein an idle input array represents idle input gates and an idle output array represents idle output gates, and in which the optimal connection path or configuration is determined by pumping the input stage array and the output stage array to determine an optimal center stage switch having idle connections between a predetermined input gate and a predetermined output gate. One important aspect of the present invention is its use in identifying the presence of a rearrangeably blocked condition of a rearrangeable communications matrix.

As a result of the above, although the invention has been described with reference to the above embodiments, its description is not meant to be construed in a limiting sense. Various modifications of the disclosed embodiment, as well as alternative embodiments of the invention will become apparent to person skilled in the art upon reference to the above description. It is therefore contemplated that the appended claims will cover such modifications that fall within the true scope of the invention.

APPENDIX A

```
/****************************************************************************/
/****************************************************************************/
/*                                                                          */
/*            Bowdon's Immediate Connect Algorithm (BICA)                   */
/*                                                                          */
/****************************************************************************/
/****************************************************************************/

/* To begin proceed to the main program at the end of the the listing.      */ include <stdio.h>
include <math.h>
#include <malloc.h>
#include <sys/types.h>
#include <sys/timeb.h>
#include <sys/time.h>

/* Global variables for immediate connection algorithm.                     */
int           in_line,
              out_line;
int           in_stage,
              in_num;
int           out_stage,
              out_num;
int           n,
```

```
                    m;
int                 command_count,
                    command_end = 10;
int                 rearrange_space,
                    rearrange_time;

int                 space_in_mat[16][16];
int                 space_cnt_mat[17][16];
int                 space_out_mat[16][16];
int                 space_in_link[16][17];
int                 space_out_link[16][17];
int                 xtra_stage = 17;
int                 traffic[2][28672];

/* Global variables for rearrangement algorithm.                   */
int                 BTOA_MV[31][3],
                    ATOB_MV[31][3];
int                 flag_A = 0,
                    flag_B = 0;

int                 *sort_array ();
int                 *chk_space_in_status ();
int                 *chk_space_out_status ();
int                 *chk_space_blocking ();
int                 *shuffle ();
int                 *implement_PM2 ();

char                name_in[13];
char                name_out[13];

static int          in_file[22];
FILE                *fp_in,
                    *fp_out;
int                 seed_array[10];
int                 p_level;
/* Structure to hold current network permutation before rearranging.  */
struct p_coordinate
{
    int             x;
    int             y;
    int             z;
};

struct p_mat_pos
{
    struct p_coordinate position[256];
};

struct p_mat_pos rearrange_3d;

/* Structure to hold the output of the rearrangement sequence.       */
struct seq_len
{
  int input_sw;
  int old_mid_sw;
  int new_mid_sw;
  int output_sw;
};

struct rearrange_seq
{
  struct seq_len move[15];
;

struct rearrange_seq  rearrange_moves;
```

```
/************************************************************/
/*                                                          */
/* This is the subprogram for BICA's number of moves from B calc.  */
/*                                                          */
/************************************************************/

/************************************************************/
/* This function first reads the rearrangement structure and picks out  */
/* the connections in the middle switch pair (A, B).  The arguments to  */
/* this function are the starting point (RB, CB) and the pair (A, B).   */
/* The function returns the number of moves starting from B.  For       */
/* reference, the starting point is described by Paull as (R1, C2).     */
/************************************************************/ chk_Paull_mat_BTOA (RB, CB, B_least, A_least)
int             RB,
                CB;
int             A_least,
                B_least;
{
    int         i,
                j,
                m = 0,
                n = 0,
                y1 = 0,
                y2 = 0,
                y3 = 0,
                n1 = 0,
                n2 = 0;
    int         x1 = 0,
                x2 = 0,
                x3 = 0,
                k1 = 0,
                m1 = 0,
                m2 = 0;
    int         flag1 = 0,
                flag2 = 0,
                flag3 = 0,
                temp_flag = 0,
                k2 = 0;
    int         r_temp = 0,
                c_temp = 0,
                F2 = 0;
    int         chosen_msw_A[16][3],
                chosen_msw_B[16][3];

c_temp = CB;
    m = 1;
    n = 2;

zero (chosen_msw_A, 48);            /* Initialize target matrices. */
    zero (chosen_msw_B, 48);

for (i = 0; i < 256; i++)
    {
        x1 = rearrange_3d.position[i].x; /* Read rearrangement struct. */
        x2 = rearrange_3d.position[i].y;
        x3 = rearrange_3d.position[i].z;

if (x3 == B_least)
        {
            chosen_msw_B[m1][0] = x1;    /* Pick out connections from */
            chosen_msw_B[m1][1] = x2;    /* middle switch B and store */
            chosen_msw_B[m1][2] = x3;    /* in chosen_msw_B.          */
            m1++;
        }
```

```c
    if (x3 == A_least)
    {
        chosen_msw_A[m2][0] = x1;      /* Pick out connections from */
        chosen_msw_A[m2][1] = x2;      /* middle switch A and store */
        chosen_msw_A[m2][2] = x3;      /* chosen_msw_A.             */
        m2--;
    }
} while (temp_flag == 0)
{
    k1 = 0;
    for (i = 0; i < 16; i++)           /* Start from (R1, C2), check */
    {                                  /* A's in the same column.    */
        x1 = chosen_msw_A[i][0];
        x2 = chosen_msw_A[i][1];
        x3 = chosen_msw_A[i][2];

if (x2 == c_temp && x3 == A_least)     /* Found an B? */
        {
            BTOA_MV[m][0] = x1;        /* Yes, then store current */
            BTOA_MV[m][1] = x2;        /* connection in BTOA_MV.  */
            BTOA_MV[m][2] = x3;
            m++;
            r_temp = x1;
            break;
        } k1++;
    } if (k1 == 16)
    {
        flag1 = 1;
        temp_flag = 1;
        F2 = m;
    } if (flag1 == 0)
    {
        k2 = 0;
        for (i = 0; i < 16; i++)       /* Start from (R1, C2), check */
        {                              /* B's in the same row.       */
            x1 = chosen_msw_B[i][0];
            x2 = chosen_msw_B[i][1];
            x3 = chosen_msw_B[i][2];

if (x1 == r_temp && x3 == B_least)    /* Found an B? */
            {
                BTOA_MV[m][0] = x1;    /* Yes, then store    */
                BTOA_MV[m][1] = x2;    /* current connection */
                BTOA_MV[m][2] = x3;    /* in BTOA_MV.        */
                m++;
                c_temp = x2;
                break;
            } k2++;
        } if (k2 == 16)
        {
            flag2 = 1;
            temp_flag = 1;
            F2 = m;
```

```
            }
        }
    }
    return (F2);                        /* Return the number of moves from B. */
}

/****************************************************************************/
/*                                                                          */
/* This is the subprogram for BICA's number of moves from A calc.           */
/*                                                                          */
/****************************************************************************/

/****************************************************************************/
/* This function first reads the rearrangement structure and picks out      */
/* the connections in the middle switch pair (A, B).  The arguments to      */
/* this function are the starting point (RA, CA) and the pair (A, B).       */
/* The function returns the number of moves starting from A.  For           */
/* reference, the starting point is described by Paull as (R2, C1).         */
/****************************************************************************/ chk_Paull_mat_ATOB (RA, CA, B_least, A_least)
int             RA,
                CA;
int             B_least,
                A_least;
{
    int         i,
                j,
                m = 0,
                n = 0,
                y1 = 0,
                y2 = 0,
                y3 = 0,
                n1 = 0,
                n2 = 0;
    int         x1 = 0,
                x2 = 0,
                x3 = 0,
                k1 = 0,
                m1 = 0,
                m2 = 0;
    int         flag1 = 0,
                flag2 = 0,
                flag3 = 0,
                temp_flag = 0,
                k2 = 0;
    int         r_temp = 0,
                c_temp = 0,
                F1 = 0,
                F2 = 0;
    int         chosen_msw_A[16][3],
                chosen_msw_B[16][3];

r_temp = RA;
    m = 1;
    n = 2;

zero (chosen_msw_A, 48);            /* Initialize target matrices. */
    zero (chosen_msw_B, 48);

for (i = 0; i < 256; i++)
    {
        x1 = rearrange_3d.position[i].x;   /* Read rearrangement struct. */
        x2 = rearrange_3d.position[i].y;
        x3 = rearrange_3d.position[i].z;
```

```c
        if (x3 == B_least)
        {
            chosen_msw_B[m1][0] = x1;       /* Pick out connections from  */
            chosen_msw_B[m1][1] = x2;       /* middle switch B and store  */
            chosen_msw_B[m1][2] = x3;       /* in chosen_msw_B.           */
            m1--;
        }
        if (x3 == A_least)
        {
            chosen_msw_A[m2][0] = x1;       /* Pick out connections from  */
            chosen_msw_A[m2][1] = x2;       /* middle switch A and store  */
            chosen_msw_A[m2][2] = x3;       /* in chosen_msw_A.           */
            m2++;
        }
} while (temp_flag == 0)
{
    k1 = 0;
    for (i = 0; i < 16; i++)                /* Start from (R2, C1), check */
    {                                       /* B's in the same row.       */
        x1 = chosen_msw_B[i][0];
        x2 = chosen_msw_B[i][1];
        x3 = chosen_msw_B[i][2];

if (x1 == r_temp && x3 == B_least)          /* Found an A? */
        {
            ATOB_MV[m][0] = x1;             /* Yes, then store current    */
            ATOB_MV[m][1] = x2;             /* connection in ATOB_MV.     */
            ATOB_MV[m][2] = x3;
            m++;
            c_temp = x2;
            break;
        }
        k1--;
    } if (k1 == 16)
    {
        flag1 = 1;
        temp_flag = 1;
        F1 = m;
    } if (flag1 != 1)
    {
        k2 = 0;
        for (i = 0; i < 16; i++)            /* Start from (R2, C1), check */
        {                                   /* A's in the same column.    */
            x1 = chosen_msw_A[i][0];
            x2 = chosen_msw_A[i][1];
            x3 = chosen_msw_A[i][2];

if (x2 == c_temp && x3 == A_least)      /* Found an A? */
            {
                ATOB_MV[m][0] = x1;         /* Yes, then store            */
                ATOB_MV[m][1] = x2;         /* current connection         */
                ATOB_MV[m][2] = x3;         /* in ATOB_MOV.               */
                m++;
                r_temp = x1;
                break;
            }
            k2++;
        } if (k2 == 16)
```

```
                    {
                        flag2 = 1;
                        temp_flag = 1;
                        F1 = m;
                    }
                }
            }
        }
        return (F1);                        /* Return the number of moves from A. */
    }

/*********************************************************************/
/*                                                                   */
/* This is the subprogram for BICA's rearrange output.               */
/*                                                                   */
/*********************************************************************/

/*********************************************************************/
/* This function is the output of the rearrangement procedure. The   */
/* arguments to this function are the required number of moves and the */
/* pair (A, B).  The sequence of moves is written into the output    */
/* structure rearrange_moves.                                        */
/*********************************************************************/

/*********************************************************************/
/* The output of the rearrangement process is a structure of the form: */
/*                                                                   */
/*      struct seq_len                                               */
/*      {                                                            */
/*          int input_sw;                                            */
/*          int old_mid_sw;                                          */
/*          int new_mid_sw;                                          */
/*          int out_sw;                                              */
/*      }                                                            */
/*                                                                   */
/*********************************************************************/ int             rearrangement_output (no_moves, AR, BR)
int             no_moves;
int             AR;
int             BR;
{
    int         i,
                j,
                k,
                m,
                n;
    int         x1 = 0,
                x2 = 0,
                x3 = 0;
    int         y1 = 0,
                y2 = 0,
                y3 = 0;

for (j = 0; j < no_moves; j++)
    { if (flag_A == 1 && flag_B == 0)    /* Is sequence from A smaller? */
        {
            y1 = ATOB_MV[j][0];             /* Read Input  switch */
            y2 = ATOB_MV[j][1];             /* Read Output switch */
            y3 = ATOB_MV[j][2];             /* Read Middle switch */
        } if (flag_B == 1 && flag_A == 0)    /* Is sequence from B smaller? */
        {
            y1 = BTOA_MV[j][0];             /* Read Input  switch */
            y2 = BTOA_MV[j][1];             /* Read Output switch */
```

```
            y3 = BTOA_MV[j][2];        /* Read Middle switch */
    } rearrange_moves.move[j].input_sw = y1;    /* Store Input switch  */ rearrange_moves.move[j].old_mid_sw = y3;
                                              /* Store Old Midddle switch */ rearrange_moves.move[j].output_sw = y2;   /* Store Output switch */

/* Store New Middle switch */
    if (y3 == AR)                             /* Change A's to B's.  */
        rearrange_moves.move[j].new_mid_sw = BR;

if (y3 == BR)                             /* Change B's to A's.  */
        rearrange_moves.move[j].new_mid_sw = AR;
    }
    return;
}

/*****************************************************************************/
/*                                                                           */
/* This is the subprogram for BICA's zero function.                          */
/*                                                                           */
/*****************************************************************************/ zero (A, n)
int         *A;
int         n;
{
    int         i;

for (i = 0; i < n; i++)
        *(A + i) = 0;
    return;
}

/*****************************************************************************/
/*                                                                           */
/* This is the subprogram for BICA's hunt algorithm starting point set.      */
/*                                                                           */
/*****************************************************************************/

/*****************************************************************************/
/* This function sets the starting points for the hunting algorithm          */
/* from A & B and executes the algorithm.  The set of connections to be      */
/* moved are stored in either ATOB_MV or BTOA_MV if either the sequence      */
/* from A is shorter or the sequence from B is shorter, respectively.        */
/* The arguments to this function are the middle switch pair (A,B),          */
/* an index and the blocked matrix position (R1,C1).  The function           */
/* returns the length of the shortest sequence.                              */
/*****************************************************************************/
int         rearrange_seq (r1_B, c1_A, sw_index, R1, C1)
int         r1_B;
int         c1_A;
int         sw_index;
int         R1;
int         C1;
{
    int         i,
                j,
                k = 0,
                x1 = 0,
                x2 = 0,
                x3 = 0,
                m,
                n,
```

```
            int         temp_mov = 0,
                        temp = 0;
                        num_moves = 0,
                        mr = 0,
                        mc = 0,
                        w_seq = 0;
            int         R[3],
                        C[3],
                        undef_flag = 0;
            int         num_moves_A = 0,
                        num_moves_B = 0,
                        F1 = 0;
            int         F2 = 0,
                        R1_CONN[16][3],
                        C1_CONN[16][3];

zero (R, 15);
    zero (C, 15);
    zero (ATOB_MV, 93);
    zero (BTOA_MV, 93);
    zero (R1_CONN, 48);
    zero (C1_CONN, 48);

m = 0;
    n = 0;

R[0] = R1;
    C[0] = C1;

BTOA_MV[0][0] = R[0];
    ATOB_MV[0][1] = C[0];

for (i = 0; i < 256; i++)    /* Pick out middle switches in (R1,C1). */
    {
        x1 = rearrange_3d.position[i].x;        /* Read structure.   */
        x2 = rearrange_3d.position[i].y;
        x3 = rearrange_3d.position[i].z;

if (x1 == R1)
        {
            R1_CONN[m][0] = x1;             /* Store middle switches in R1. */
            R1_CONN[m][1] = x2;
            R1_CONN[m][2] = x3;
            m++;
        } if (x2 == C1)
        {
            C1_CONN[n][0] = x1;             /* Store middle switches in C1. */
            C1_CONN[n][1] = x2;
            C1_CONN[n][2] = x3;
            n++;
        }
    } for (i = 0; i < 15; i++)       /* Find the matrix position R2, C2. */
    {
        x1 = R1_CONN[i][2];        /* R1_CONN is the connections in R1 */
        x2 = C1_CONN[i][2];        /* C1_CONN is the connections in C1 */ if (x1 == r1_B)
            C[1] = R1_CONN[i][1];
        if (x2 == c1_A)
            R[1] = C1_CONN[i][0];
    }
```

```
    BTOA_MV[0][1] = C[1];           /* Set start point for search from A&B. */
    ATOB_MV[0][0] = R[1];           /* A is from (R2, C1); B from (R1, C2). */

BTOA_MV[0][2] = rl_B;           /* The 3rd element of BTOA_MV & ATOB_MV */
    ATOB_MV[0][2] = cl_A;           /* is alternating sequence of A's & B's */
                                    /* A's are changed to B's & B's to A's. */

/* Set starting point for A. */
    mr = R[1];
    mc = C[0];

/* Hunting algorithm from A. */
    num_moves_A = chk_Paull_mat_ATOB (mr, mc, rl_B, cl_A);    /* REPLACE  */
                                                              /* w/ FLOOD */

/* Set starting point for B. */
    mr = R[0];
    mc = C[1];
    /* Hunting algorithm from B */ num_moves_B = chk_Paull_mat_BTOA (mr, mc, rl_B, cl_A);    /* REPLACE  */
                                                              /* w/ FLOOD */
    F1 = num_moves_A;
    F2 = num_moves_B;

if (F1 < F2)                    /* Is num_moves_A < num_moves_B ?       */
    {
        w_seq = 1;                  /* If yes, set flag_A = 1, flag_B = 0.  */
        num_moves = F1;
        flag_A = 1;
        flag_B = 0;
    } if (F2 < F1)                    /* Is num_moves_B < number_moves_A ?    */
    {
        w_seq = 2;                  /* If yes, set flag_A = 0, flag_B = 1.  */
        num_moves = F2;
        flag_A = 0;
        flag_B = 1;
    } if (F1 == F2)                   /* Is number_moves_A = number_moves_B ? */
    {
        w_seq = 1;                  /* If yes, default to sequence from A.  */
        num_moves = F1;
        flag_A = 1;                 /* and set flag_A = 1, flag_B = 0.      */
        flag_B = 0;
    }
    return (num_moves);             /* Return the least number of moves.    */
}

/**********************************************************************/
/*                                                                    */
/* This is the subprogram for BICA's implement change algorithm.      */
/*                                                                    */
/**********************************************************************/

/**********************************************************************/
/* This function implements the hunting algorithm to find the sequence */
/* of moves required for rearrangement. The arguments to this function */
/* are the middle switch pair (msw_A, msw_B) and the index.            */
/**********************************************************************/ int         implement_change (msw_B, msw_A, index)
int         msw_B;
int         msw_A;
```

```
int             index;
{ int         i,
                j,
                k;
    int         len_of_seq = 0;

len_of_seq = rearrange_seq (msw_B, msw_A, index);
    rearrangement_output (len_of_seq, msw_A, msw_B);
    return (len_of_seq);
}

/***********************************************************************/
/*                                                                     */
/* This is the subprogram for BICA's calculate number of moves.        */
/*                                                                     */
/***********************************************************************/

/***********************************************************************/
/* This routine uses the implement_change_algorithm function to find   */
/* the number of moves required for the sequence of moves from sw_A and*/
/* and for the sequence of moves from sw_B for the existing connections*/
/* in the center stage switch pair (A, B) and returns the number of    */
/* moves required for the smaller of the two sequences.                */
/***********************************************************************/ int             calc_nom (sw_B, sw_A, index)
int             sw_B,
                sw_A,
                index;
{
    int         num_moves;
    num_moves = implement_change (sw_B, sw_A, index);
    return(num_moves);
}

/***********************************************************************/
/*                                                                     */
/* This is the subprogram for BICA's matrix model conversion.          */
/*                                                                     */
/***********************************************************************/

/***********************************************************************/
/* The present implementation of Paull's method needs the connect data */
/* in the following structure.                                         */
/*                                                                     */
/*      struct p_coordinate                                            */
/*      {                                                              */
/*          int input_sw;                                              */
/*          int output_sw;                                             */
/*          int cnt_sw;                                                */
/*      }                                                              */
/*                                                                     */
/*      struct p_mat_pos                                               */
/*      {                                                              */
/*          struct p_coordinate[256];                                  */
/*      }                                                              */
/*                                                                     */
/***********************************************************************/ void            matrix_model_conversion ()
{
    int         i,
                j,
                x1,
```

```c
                    x2,
                    x3,
                    ml = 0;

for(i = 1; i <= 17; i++)
    {
        for(j = 1; j <= 17; j++)
        {
            x1 = i;
            x2 = j;
            x3 = space_cnt_mat[i][j];
            if(x3 != 0)
            {
                rearrange_3d.position[ml].x = x2;    /* Input switch  */
                rearrange_3d.position[ml].y = x3;    /* Output switch */
                rearrange_3d.position[ml].z = x1;    /* Middle switch */
                ml++;
            }
        }
    }
    return;
}

/****************************************************************************/
/*                                                                          */
/* This is the subprogram for BICA's version of Paull's method II.          */
/*                                                                          */
/****************************************************************************/

/****************************************************************************/
/* This function uses Paull's method II to search for (A, B) pairs.         */
/****************************************************************************/ int             *implement_PM2 ()
{
    int             i,
                    j,
                    k,
                    x1,
                    x2,
                    m = 0,
                    n = 0;
    int             *selected_pair,
                    R1_cnt_sw[16],
                    C1_cnt_sw[16];
    int             listofB[16],
                    listofA[16],
                    A_temp = 0,
                    B_temp = 0;
    int             cnt_stage_pairs[8][2],
                    op_flag;
    int             num_moves,
                    least_moves,
                    least_pair;

/* convert from 3 matrix model to rearrangement structure.              */
    /* Return pointer to structure or Global must be visible.               */ matrix_model_conversion ();      /* Converts 2nd of 3-matrix model. */ selected_pair = (int *) calloc (2, sizeof (int));

/* Given a connect request (I,O), where I is an INPUT SWITCH and O is       */
/* an OUTPUT SWITCH, read the row vectors in matrices 1 & 2. Then, XOR      */
/* the two vectors to get a list of candidates for (A,B).                   */
```

```
    for (j = 1; j < 17; j++)
    {
        R1_cnt_sw[j] = space_in_mat[in_stage][j];
        C1_cnt_sw[j] = space_cnt_mat[out_stage][j];
    } for (j = 0; j < 16; j++)
    {
        x1 = R1_cnt_sw[j];
        x2 = C1_cnt_sw[j];

if (x1 == 0 && x2 != 0)                 /* The XOR operation.     */
        {
            listofA[m] = x2;
            m--;
        }
        if (x1 != 0 && x2 == 0)
        {
            listofB[n] = x1;
            n--;
        }
    } m = 0;
    n = 0;
    i = 0;
    while ((x1 = listofB[i]) != 0)           /* Create all combinations of */
    {                                        /* elements of listofA's      */
        j = 0;                               /* & listofB's.               */ while ((x2 = listofA[j]) != 0)
        {
            cnt_stage_pairs[m][0] = x1;
            cnt_stage_pairs[m][1] = x2;
            m--;
            j--;
        } i++;
    } least_moves = xtra_stage;
    for (k = 0; k < m; k++)              /* For each combination of middle */
    {                                    /* switches, calculate least num. */
        B_temp = cnt_stage_pairs[k][0];  /* of moves that are required.   */
        A_temp = cnt_stage_pairs[k][1];

if (B_temp != 0 && A_temp != 0)
        {
            num_moves = calc_nom (B_temp, A_temp, k);
        } if (num_moves < least_moves)
        {
            least_moves = num_moves;
            least_pair = m;
        }
    }

*(selected_pair + 0) = cnt_stage_pairs[least_pair][1];
    *(selected_pair + 1) = cnt_stage_pairs[least_pair][0];

return (selected_pair);
}

/****************************************************************************/
```

```
/************************************************************/
/*                                                          */
/* The following are the revised subprograms and main program for BICA. */
/*                                                          */
/************************************************************/
/************************************************************/

/************************************************************/
/*                                                          */
/* This is the subprogram for BICA's hitless time rearrangement. */
/*                                                          */
/************************************************************/ int             hitless_time_rearrange ()
{
    /* Use Include File. */
    return;
}

/************************************************************/
/*                                                          */
/* This is the subprogram for BICA's flood time algorithm.  */
/*                                                          */
/************************************************************/ int             flood_time ()
{
    /* Use Include File. */
    return;
}

/************************************************************/
/*                                                          */
/* This is the subprogram for BICA's select two time slots. */
/*                                                          */
/************************************************************/ int             select_time_slots ()
{
    /* Use Include File. */
    return;
}

/************************************************************/
/*                                                          */
/* This is the subprogram for BICA's hitless space rearrangement. */
/*                                                          */
/************************************************************/ int             hitless_space_rearrange ()
{
    /* Use Include File. */
    return;
}

/************************************************************/
/*                                                          */
/* This is the subprogram for BICA's flood space algorithm. */
/*                                                          */
/************************************************************/ int             flood_space ()
{
    /* Use Include File. */
    return;
}
```

```
/****************************************************************************/
/*                                                                          */
/* This is the subprogram for BICA's pump link macro.                       */
/*                                                                          */
/****************************************************************************/

/****************************************************************************/
/* This macro logically "ands" space_in_link[i] with space_out_link[k]      */
/* to determine the lowest numbered center stage switch, "c," having        */
/* both an idle link to input stage "i" and an idle link to output          */
/* stage "k." The first non-zero entry in the result of the logical        */
/* "and" is "c" and the two links to "c" are reset to "0" (marked as       */
/* busy) in space_in_link[i] and space_out_link[k]. The macro returns       */
/* the value "c."                                                           */
/****************************************************************************/ int          pump_link ()
{
    int          c,
                 j,
                 x;

for (j = 1; j <= xtra_stage; j++)
    {
        x = space_in_link[in_stage][j] && space_out_link[out_stage][j];

if (x == 1)
        {
            c = j;
            break;
        }
    } clear_link(space_in_link, in_stage, c);
    clear_link(space_out_link, out_stage, c);

if (c == xtra_stage)
    {
        rearrange_space = 1;
    }

/* Return center stage. */
    return(c);
}

/****************************************************************************/
/*                                                                          */
/* This is the subprogram for BICA's clear idle link bit (to 0).            */
/*                                                                          */
/****************************************************************************/

/****************************************************************************/
/* This primative is used to clear (reset) the kth bit of the jth row       */
/* of the bit map specified by io to "0." If the bit map contains n         */
/* elements and the value of j > n, then an error flag is returned.         */
/* Otherwise, the kth element is reset to "0."                              */
/****************************************************************************/ int          clear_link(io, j, k)
int          io[16][17],
             j,
             k;
{
    int          error_flag;

if(k <= xtra_stage)
    {
```

```
            io[j][k] = 0;
            error_flag = 0;
        }
        else
        {
            error_flag = 1;
        }
        return(error_flag);
}

/*******************************************************************/
/*                                                                 */
/* This is the subprogram for BICA's set idle link bit (to 1).     */
/*                                                                 */
/*******************************************************************/

/*******************************************************************/
/* This primative is used to set the kth bit of the jth row of the bit */
/* map specified by io to "1."  If the bit map contains n elements and */
/* the value of j > n, then an error flag is returned. Otherwise, the  */
/* kth element is set to "1."                                      */
/*******************************************************************/ int             set_link(io, j, k)
int             io[16][17],
                j,
                k;
{
    int         error_flag;

if(k <= xtra_stage)
    {
        io[j][k] = 1;
        error_flag = 0;
    }
    else
    {
        error_flag = 1;
    }
    return(error_flag);
}

/*******************************************************************/
/*                                                                 */
/* This is the subprogram for BICA's select two center stage switches. */
/*                                                                 */
/*******************************************************************/ int             select_cnt_stage ()
{
    int *center_stage_pair;

center_stage_pair = (int *)calloc(2, sizeof(int));

/* select middle stage switch pair */ center_stage_pair = implement_PM2 ();

return(*center_stage_pair);
}

/*******************************************************************/
/*                                                                 */
/* This is the subprogram for BICA's time rearrangement.           */
/*                                                                 */
/*******************************************************************/
```

```c
/* Node D */
void            time_rearrange ()
{
    int         XtoA = 0,
                XtoB = 0;
    char        last;

/* Select Two Time Slots for Rearrangement. */
    select_time_slots ();

/* Find Connections to be Rearranged. */
    flood_time ();

/* Q6: Which Path Requires Least Number of Rearrangements? */
    if (last == 'A')
    {
        XtoA = 1;
    }
    else
    {
        if (last == 'B')
        {
            XtoB = 1;
        }
    }
    hitless_time_rearrange ();
    rearrange_time = 0;
    return;
}

/****************************************************************************/
/*                                                                          */
/* This is the subprogram for BICA's space rearrangement.                   */
/*                                                                          */
/****************************************************************************/

/* Node C */
void            space_rearrange ()
{
    int         XtoA = 0,
                XtoB = 0;
    int         *cnt_stage_pair;

char        last;

/* allocate memory for pointer to list of connections to be moved. */
    cnt_stage_pair = (int *)calloc(2, sizeof(int));

/* Select Two Center Stage Switches for Rearrangement. */
    *cnt_stage_pair = select_cnt_stage ();

/* Find Connections to be Rearranged. */
    flood_space ();

/* Q5: Which Path Requires Least Number of Rearrangements? */
    if (last == 'A')
    {
        XtoA = 1;
    }
    else
    {
        if (last == 'B')
        {
            XtoB = 1;
        }
    }
```

```
    hitless_space_rearrange ();
    rearrange_space = 0;
    return;
}

/****************************************************************************/
/*                                                                          */
/* This is the subprogram for BICA's remainder function.                    */
/*                                                                          */
/****************************************************************************/
/****************************************************************************/
/* This function produces the remainder after the divisor has been          */
/* subtracted from the dividend as many (integer) times as possible.        */
/****************************************************************************/ int         rem(dividend, divisor)
int         dividend,
            divisor;
{ int         remainder;

if (dividend <= 0)
    {
        remainder = 0;
    }
    else
        remainder = dividend;
        while (remainder >= divisor)
        {
            remainder = remainder - divisor;
        }
    return(remainder);
}

/****************************************************************************/
/*                                                                          */
/* This is the subprogram for BICA's quotient function.                     */
/*                                                                          */
/****************************************************************************/
/****************************************************************************/
/* This function produces the quotient by subtracting the divisor from      */
/* the dividend as many (integer) times as possible.                        */
/****************************************************************************/ int         quot(dividend, divisor)
int         dividend,
            divisor;
{ int         quotient,
                remainder;

quotient = 0;
    if (dividend <= 0)
    {
        remainder = 0;
    }
    else
        remainder = dividend;
        while (remainder >= divisor)
        {
            remainder = remainder - divisor;
            quotient++;
        }
    return(quotient);
```

}

```c
/***************************************************************/
/*                                                             */
/* This is the subprogram for BICA's convert I/O line numbers. */
/*                                                             */
/***************************************************************/

/***************************************************************/
/* This subprogram uses the quotient and remainder functions to convert */
/* the I/O line numbers for a connect or disconnect to a pair of I/O    */
/* stage switch numbers and I/O stage switch pin number.                */
/***************************************************************/ void        convert_line ()
{
    int         r = 16,
                in_line_minus_1,
                out_line_minus_1;

in_line_minus_1 = in_line - 1;
    in_stage = quot(in_line_minus_1, r) + 1;
    in_num = rem(in_line_minus_1, r) + 1;

out_line_minus_1 = out_line - 1;
    out_stage = quot(out_line_minus_1, r) + 1;
    out_num = rem(out_line_minus_1, r) + 1;

return;
}

/***************************************************************/
/*                                                             */
/* This is the subprogram for BICA's print statistics - n and m. */
/*                                                             */
/***************************************************************/ int         print_stats ()
{
    /* Test case for print_stats. */
    printf ("BICA performed %d connect(s) and %d disconnect(s).\n", n, m);
    return;
}

/***************************************************************/
/*                                                             */
/* This is the subprogram for BICA's disconnect - input from output. */
/*                                                             */
/***************************************************************/

/* Node B */
void        disconnect ()
{
    int         cnt_stage,
                csw;            /* csw for Center Stage sWitch. */

/* Convert IL-m -> OL-n Disconnect Request to I(i,j) >< O(k,l) Format. */
    convert_line ();
    convert_line ();

/* Remove Connections as Requested.                                    */
    csw = space_in_mat[in_stage][in_num];
    space_in_mat[in_stage][in_num] = 0;
    space_cnt_mat[csw][in_stage] = 0;
    space_out_mat[out_stage][out_num] = 0;
```

```
/* Update Tables.
   set_link(space_in_link, in_stage, csw);
   set_link(space_out_link, out_stage, csw);

/* Q7: Pack Connections After A Disconnect Enabled? */
   if (rearrange_space == 1)
      /* A3 = YES -> Node C. */
   {
      space_rearrange ();
   }
   /* A3 = NO.         */
   else
      /* End Space Domain.*/
   {
      /* Q4: Time Rearrangement Required? */
      if (rearrange_time == 1)
         /* A4 = YES -> Node D. */
      {
         time_rearrange ();
      }
      /* A4 = NO.         */
      /* End Time Domain. */
   }
   return;
}

/****************************************************************************/
/*                                                                          */
/* This is the subprogram for BICA's connect - input to output.             */
/*                                                                          */
/****************************************************************************/

/****************************************************************************/
/* This routine connects an input line to an output line through the        */
/* space matrix. Variables are defined as follows:                          */
/*                                                                          */
/*   in_line:    an input to the space matrix,                              */
/*               0 <= in_line <= 255                                        */
/*   out_line:   an output from the space matrix,                           */
/*               0 <= out_line <= 255                                       */
/*                                                                          */
/*   in_stage:   an input stage of the space matrix,                        */
/*               0 <= in_stage <= 15                                        */
/*   in_num:     an input to an input stage of the space matrix,            */
/*               0 <= in_number <= 15                                       */
/*                                                                          */
/*   out_stage:  an output stage from the space matrix,                     */
/*               0 <= out_stage <= 15                                       */
/*   out_num:    an output from an output stage of the space matrix,        */
/*               0 <= out_number <= 15                                      */
/*                                                                          */
/*   cnt_stage:  a center stage of the space matrix,                        */
/*               0, 1 <= center_stage <= 17                                 */
/*       NOTE:   center_stage = 0, means that no center stage of the        */
/*               space matrix has been assigned.                            */
/*               center_stage = 1, ..., 16 means that the corresponding     */
/*               center stage of the space matrix is assigned.              */
/*               center_stage = 17 is the extra stage of the space          */
/*               matrix, and rearrangement is in progress.                  */
/*                                                                          */
/****************************************************************************/

/* Node A */
   void            connect ()
   {
      int             csw;                /* csw for Center Stage switch. */
```

```
/* Convert IL-m -> OL-n Connection Request to I(i,j) -> O(k,l) Format.  */
    convert_line ();

/* Begin Time Domain.                                                    */

/* Select Lowest Numbered Time Slot Available for Connection.            */

/* Begin Space Domain.                                                   */

/* Select Lowest Numbered Center Stage Available for Connection.         */
    csw = pump_link ();

/* Make Connection and Update Tables.                                    */
    space_in_mat[in_stage][in_num] = csw;
    space_cnt_mat[csw][in_stage] = out_stage;
    space_out_mat[out_stage][out_num] = csw;

/* Q3: Space Rearrangement Required? */
    if (rearrange_space == 1)
        /* A3 = YES -> Node C. */
    {
        space_rearrange ();
    }
    /* A3 = NO.         */
    else
        /* End Space Domain. */
    {
        /* Q4: Time Rearrangement Required? */
        if (rearrange_time == 1)
            /* A4 = YES -> Node D. */
        {
            time_rearrange ();
        }
        /* A4 = NO.         */
        /* End Time Domain. */
    }
    return;
}

/**********************************************************************/
/*                                                                    */
/* This is the subprogram for BICA's get command.                     */
/*                                                                    */
/**********************************************************************/ int         get_command ()
{
    int         command;

/* Test case for get_command. */
    if (command_count < command_end)
    {
        /* command = 1 => connect. */
        command = 1;
        command_count++;
        in_line = command_count;
        out_line = command_count;
    }
    else if (command_count == command_end)
    {
        /* command = -1 => disconnect. */
        command = -1;
        command_count++;
    }
    else
    {
```

```c
        /* command = 0 => end. */
        command = 0;
    }
    return(command);
}

/****************************************************************/
/*                                                              */
/* This is the subprogram for BICA's space rearrange initialization. */
/*                                                              */
/****************************************************************/ void            initialize_rearrange ()
{
    int         i;

for (i = 0; i < 256; i++)
    {
        rearrange_3d.position[i].x = 0;
        rearrange_3d.position[i].y = 0;
        rearrange_3d.position[i].z = 0;
    }
    for (i = 0; i < 15; i++)
    {
        rearrange_moves.move[i].input_sw = 0;
        rearrange_moves.move[i].old_mid_sw = 0;
        rearrange_moves.move[i].new_mid_sw = 0;
        rearrange_moves.move[i].output_sw = 0;
    }
    return;
}

/****************************************************************/
/*                                                              */
/* This is the subprogram for BICA's space matrix initialization. */
/*                                                              */
/****************************************************************/

/****************************************************************/
/* This routine is used initially to clear (reset) the space matrices. */
/****************************************************************/ void            initialize_space_mat()
{
    int i, j;

for(i = 0; i < xtra_stage; i++)
    {
        for(j = 0; j < xtra_stage; j++)
        {
            space_in_mat[i][j] = 0;
            space_cnt_mat[i][j] = 0;
            space_out_mat[i][j] = 0;
        }
        space_cnt_mat[xtra_stage][i] = 0;
    }
    return;
}

/****************************************************************/
/*                                                              */
/* This is the subprogram for BICA's initialize idle link bit maps. */
/*                                                              */
/****************************************************************/
```

```
/****************************************************************/
/* The initialize link bit maps primitive (used only for start-up */
/* operations) initializes both the space input idle link bit map and */
/* the space output link bit map. All entries in the idle link bit */
/* maps are initialized to "1," indicating that all links are idle. */
/****************************************************************/ void        init_links()
{
    int i, j;

for(i = 0; i < xtra_stage; i++)
    {
        for(j = 0; j <= xtra_stage; j++)
        {
            space_in_link[i][j] = 1;
            space_out_link[i][j] = 1;
        }
    }
    return;
}

/****************************************************************/
/*                                                              */
/* This is the subprogram for BICA's initialization.            */
/*                                                              */
/****************************************************************/ void        initialize ()
{
    /* Test data for commands. */
    n = 0;
    m = 0;

command_count = 0;
    rearrange_space = 0;
    rearrange_time = 0;

/* Initialize all matrices. */
    init_links();
    initialize_space_mat ();
    initialize_rearrange ();

return;
}

/****************************************************************/
/*                                                              */
/* This is the main program for Bowdon's Immediate Connect Algorithm. */
/*                                                              */
/****************************************************************/ main ()
{ int         command;

/* Start Program Flow Here. */
    initialize ();
    do
    {
        command = get_command ();

/* Q1: Pair of Ports Presented for Connection? */
        /* command = 1 => connect. */
        if (command == 1)
```

```
        /* A1 = YES -> Node A. */
{
        connect ();
        n = n++;
}
/* A1 = NO.          */
else
        /* Q2: Pair of Ports Presented for Disconnect? */
{
        /* command = -1 => disconnect. */
        if (command == -1)
                /* A2 = YES -> Node B. */
        {
                disconnect ();
                m = m--;
        }
        /* A2 = NO.         */
        continue;
}
}
/* command = 0 => end. */
while (command != 0);
{
        print_stats ();
}
}
```

What is claimed is:

1. A method for making a connection along an optimum path in a communications matrix between a first switch and a second switch, said communications matrix having a plurality of first stage switches, a plurality of N second stage switches and a plurality of third stage switches and having a first set of links between ones of said first stage switches and ones of said second stage switches, and having a second set of links between ones of said second stage switches and ones said third stage switches, wherein said first switch is a first stage switch and wherein said second switch is a third stage switch, said method comprising the steps of:

ranking said second stage switches in numerical order from 1 to N to establish a priority, wherein said first-ranked second stage switch is the highest priority switch and said Nth-ranked second stage switch is the lowest priority switch;

representing the status of said first set of links with a first link array wherein each element of said first link array corresponds to the status of a specific one of said first set of links and wherein each element has a first logical value when the corresponding link is idle and a second logical value when the corresponding link is busy and wherein;

representing the status of said second set of links with a second link array wherein each element of said second link array corresponds to the status of a specific one of said second set of links and wherein each element has said first logical value when the corresponding link is idle and said second logical value when the corresponding link is busy;

finding the optimum path using said first link array and said second link array by identifying a third switch, said third switch comprising the highest ranked second stage switch for which both the element of said first link array corresponding to the link between said first switch and said third switch has said first value and the element of said second link array corresponding to the link between said third switch and said second switch has said first value;

connecting said first switch to said third switch following said finding step; and connecting said third switch to said second switch following said finding step.

2. The method of claim 1, further comprising the steps of:

updating said first link array by changing the element corresponding to the link between said first switch and said third switch from said first value to said second value; and updating said second link array by changing the element corresponding to the link between said third switch and said second switch from said first value to said second value.

3. The method of claim 1 wherein said finding step comprises:

initially establishing said third switch to be said highest priority switch;

determining if both the element of said first link array corresponding to the link between said first switch and said third switch and the element of said second link array corresponding to the link between said third switch and said second switch each have said first value;

establishing said third switch to be said next-ranked second stage switch if the links in the determining step did not both have said first value; and repeating said determining step if the links in the determining step did not both have said first value.

4. The method of claim 3 and further comprising the steps of:

updating said first link array by changing the element corresponding to the link between said first switch and said third switch from said first value to said second value; and updating said second link array by changing the element corresponding to the link between said third switch and said second switch from said first value to said second value.

5. A method for making a connection along an optimum path in a communications matrix between a first switch and a second switch and for detecting when to rearrange said communications matrix, said communications matrix having a plurality of first stage switches, a plurality of N second stage switches and a plurality of third stage switches and having a first set of links between ones of said first stage switches and ones of said second stage switches, and having a second set of links between ones of said second stage switches and ones said third stage switches, wherein said first switch is a first stage switch and wherein said second switch is a third stage switch, said method comprising the steps of:

ranking said second stage switches in numerical order from 1 to N, wherein said first-ranked second stage switch is the highest priority switch and said Nth-ranked second stage switch is the lowest priority switch;

representing the status of said first set of links with a first link array wherein each element of said first link array corresponds to the status of a specific one of said first set of links and wherein each element has a first logical value when the corresponding link is idle and a second logical value when the corresponding link is busy and wherein;

representing the status of said second set of links with a second link array wherein each element of said second link array corresponds to the status of a specific one of said second set of links and wherein each element has said first logical value when the corresponding link is idle and said second logical value when the corresponding link is busy;

finding the optimum path using said first link array and said second link array by identifying a third switch, said third switch comprising the highest ranked second stage switch for which both the element of said first link array corresponding to the link between said first switch and said third switch has said first value and the element of said second link array corresponding to the link between said third switch and said second switch has said first value;

connecting said first switch to said third switch following said finding step;

connecting said third switch to said second switch following said finding step; and generating an indication to rearrange said communications matrix when said third switch is said lowest priority switch.

6. The method of claim 5, further comprising the steps of:

updating said first link array by changing the element corresponding to the link between said first switch and said third switch from said first value to said second value; and updating said second link array by changing the element corresponding to the link between said third switch and said second switch from said first value to said second value.

7. The method of claim 5 wherein said finding step comprises:

initially establishing said third switch to be said highest priority switch;

determining if both the element of said first link array corresponding to the link between said first switch and said third switch and the element of said second link array corresponding to the link between said third switch and said second switch each have said first value;

establishing said third switch to be said next-ranked second stage switch if the links in the determining step did not both have said first value; and repeating said determining step if the links in the determining step did not both have said first value.

8. The method of claim 7 and further comprising the steps of:

updating said first link array by changing the element corresponding to the link between said first switch and said third switch from said first value to said second value; and updating said second link array by changing the element corresponding to the link between said third switch and said second switch from said first value to said second value.

* * * * *